US009498914B2

(12) United States Patent
Brassard et al.

(10) Patent No.: US 9,498,914 B2
(45) Date of Patent: Nov. 22, 2016

(54) 3D MICROFLUIDIC DEVICES BASED ON OPEN-THROUGH THERMOPLASTIC ELASTOMER MEMBRANES

(75) Inventors: Daniel Brassard, Longueil (CA); Emmanuel Roy, Montreal (CA); Kebin Li, Longueuil (CA); Teodor Veres, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 259 days.

(21) Appl. No.: 13/985,317

(22) PCT Filed: Feb. 15, 2011

(86) PCT No.: PCT/CA2011/000154
§ 371 (c)(1),
(2), (4) Date: Aug. 14, 2013

(87) PCT Pub. No.: WO2012/109724
PCT Pub. Date: Aug. 23, 2012

(65) Prior Publication Data
US 2013/0317130 A1 Nov. 28, 2013

(51) Int. Cl.
*B29C 51/00* (2006.01)
*B29C 43/02* (2006.01)
*B29C 43/04* (2006.01)

(52) U.S. Cl.
CPC .............. *B29C 51/00* (2013.01); *B29C 43/021* (2013.01); *B29C 43/04* (2013.01)

(58) Field of Classification Search
CPC ................... B29C 43/021; B29C 43/04; B29C 51/00
See application file for complete search history.

(56) References Cited

U.S. PATENT DOCUMENTS

| 3,532,587 | A | 10/1970 | Ungar et al. |
|---|---|---|---|
| 6,167,910 | B1 | 1/2001 | Chow |
| 6,321,791 | B1 | 11/2001 | Chow |
| 6,494,230 | B2 | 12/2002 | Chow |
| 6,619,311 | B2 | 9/2003 | O'Connor et al. |
| 6,645,432 | B1 | 11/2003 | Anderson et al. |
| 6,648,015 | B1 | 11/2003 | Chow |
| 6,686,184 | B1 | 2/2004 | Anderson et al. |
| 6,848,462 | B2 | 2/2005 | Covington et al. |
| 6,857,449 | B1 | 2/2005 | Chow |
| 7,267,938 | B2 | 9/2007 | Anderson et al. |
| 7,323,143 | B2 | 1/2008 | Anderson et al. |
| 7,351,303 | B2 | 4/2008 | Liu et al. |
| 7,390,377 | B1 | 6/2008 | Wallow et al. |
| 7,531,120 | B2 | 5/2009 | Van Rijn et al. |
| 2002/0112961 | A1 | 8/2002 | O'Connor et al. |
| 2002/0155010 | A1 | 10/2002 | Karp et al. |
| 2003/0196695 | A1 | 10/2003 | O'Connor et al. |
| 2004/0126538 | A1 | 7/2004 | Corcoran et al. |
| 2004/0228734 | A1 | 11/2004 | Jeon et al. |
| 2004/0241049 | A1 | 12/2004 | Carvalho |
| 2004/0258571 | A1 | 12/2004 | Lee et al. |
| 2005/0118393 | A1 | 6/2005 | Corcoran et al. |
| 2005/0256259 | A1* | 11/2005 | Goto ........................ C08L 83/04 524/588 |
| 2006/0153741 | A1 | 7/2006 | Yoshida |
| 2006/0272716 | A1 | 12/2006 | Hawkins et al. |
| 2007/0012891 | A1 | 1/2007 | Maltezos et al. |
| 2007/0048192 | A1 | 3/2007 | Kartalov et al. |
| 2007/0105339 | A1 | 5/2007 | Faris |
| 2008/0122140 | A1 | 5/2008 | Anderson et al. |
| 2008/0123174 | A1 | 5/2008 | Wen et al. |
| 2008/0124663 | A1 | 5/2008 | Anderson et al. |

FOREIGN PATENT DOCUMENTS

| CA | 2604973 | | 10/2006 |
|---|---|---|---|
| CA | 2681897 | | 4/2011 |
| EP | 1935843 | | 6/2008 |
| JP | 2001088135 | A * | 4/2001 |
| JP | 2004358775 | A * | 12/2004 |
| WO | WO2006043922 | | 4/2006 |
| WO | WO2007061448 | | 5/2007 |
| WO | WO2008049083 | | 4/2008 |
| WO | WO2008078986 | | 7/2008 |
| WO | WO2009121037 | | 10/2009 |
| WO | WO2009126257 | | 10/2009 |

OTHER PUBLICATIONS

JP2001-088135 Machine translation, Apr. 2001.*
Schift H et al., (2006) Perforated polymer membranes fabricated by nanoimprint. Microelectron. Eng. 83(4-9), 873.
Sodunke TR et al., (2007) Micropatterns of Matrigel for three-dimensional epithelial cultures. Biomaterials. 28, 4006.
Stoyanov I et al., (2005) Low-cost and chemical resistant microfluidic devices based on thermoplastic elastomers for a novel biosensor system. Mater. Res. Soc. Symp. Proc. 872, 169.
Stoyanov I et al., (2006) Microfluidic devices with integrated active valves based on thermoplastic elastomers. Microelectron. Eng. 83, 1681.
Sudarsan AP, Ugaz VM. (2004a) Printed Circuit Technology for Fabrication of Plastic-Based Microfluidic Devices. Anal. Chem. 76, 3229.
Sudarsan AP, Wang J, Ugaz VM. (2004b) Novel thermoplastic elastomers for microfluidic device construction. 8th International Conference on Miniaturized Systems for Chemistry and Life Sciences. p. 22.

(Continued)

*Primary Examiner* — Irina S Zemel
(74) *Attorney, Agent, or Firm* — Jason E. J. Davis

(57) ABSTRACT

The invention provides a new process for patterning TPE membranes for use in the design and fabrication of 3D microfluidic devices. The process involves patterning a TPE material without permitting the highest features of the mold to come into contact with the counter-plate, whereby adhesion between the TPE and the mold or counter-plate during demolding results directly in removal of the excess layer from the TPE membrane to produce well formed micrometric-sized open-through holes in the TPE membrane. The process permits rapid, reliable and efficient patterning of densely packed and arbitrarily placed micrometric open-through holes and channels of high aspect-ratio and any shape or wall profile in thin TPE membranes.

28 Claims, 10 Drawing Sheets

(56) References Cited

OTHER PUBLICATIONS

Sudarsan AP, Wang J, Ugaz VM. (2005) Thermoplastic Elastomer Gels: An Advanced Substrate for Microfluidic Chemical Analysis Systems. Anal. Chem. 77(16), 5167.
Therriault D, White SR, Lewis JA. (2003) Chaotic mixing in three-dimensional microvascular networks fabricated by direct-write assembly. Proteins: Struct., Funct. Bioinf. 2, 265.
Toepke MW, Beebe DJ. (2006) PDMS absorption of small molecules and consequences in microfluidic applications. Lab Chip. 6, 1484.
Trimbach et al., (2003) Block Copolymer Thermoplastic Elastomers for Microcontact Printing. Langmuir. 19(26), 10957-10961.
Vickers JA, Caulum MM, Henry CS. (2006) Generation of Hydrophilic Poly(dimethylsiloxane) for High-Performance Microchip Electrophoresis. Anal. Chem. 78(21), 7446.
Vozzi G, et al. (2003) Fabrication of PLGA scaffolds using soft lithography and microsyringe deposition. Biomaterials. 24, 2533.
Wang Z-H, Meng Y-H, Ying P-Q, Qi C, Jin G. (2006) A label-free protein microfluidic array for parallel immunoassays, Electrophoresis. 27, 4078-4085.
Worgull M. 2009. Hot Embossing—Theory and Technology of Microreplication. (William Andrew publisher, Oxford, UK) Section 5.5.3.2, pp. 154-157.
Wu H, et al. (2003) Fabrication of Complex Three-Dimensional Microchannel Systems in PDMS. Journal of the American Chemical Society. 125(2), 554 (2003).
Yoon et al. (1988) Novel monolithic and multilevel integration of high-precision 3-D microfluidic components. Proceedings of SPIE The International Society for Optical Engineering. 3515, 183.
Zhao S et al. (2009) Direct projection on dry-film photoresist (DP2): Do-it-yourself three-dimensional polymer microfluidics. Lab Chip. 9, 1128-1132.
ISR and WO from corresponding PCT/CA2011/000154 mailed Nov. 2, 2011.
IPRP from corresponding PCT/CA2011/000154 issued Aug. 21, 2013.
Abgrall P et al. (2006) A novel fabrication method of flexible and monolithic 3D microfluidic structures using lamination of SU-8 films. Journal of Micromechanics and Microengineering. 16, 113.
Anderson JR et al. (2000) Fabrication of Topologically Complex Three-Dimensional Microfluidic Systems in PDMS by Rapid Prototyping. Anal. Chem. 72(14), 3158.
Bartholomeusz DA, et al. (2005) Xurography: Rapid Prototyping of Microstructures Using a Cutting Plotter. J. Microelectromech. Syst. 14(6), 1364.
Bartolo D, et al. (2008) Microfluidic stickers. Lab Chip. 8, 274.
Bodas D, et al. (2006) Formation of more stable hydrophilic surfaces of PDMS by plasma and chemical treatments. Microelectron. Eng. 83, 1277.
Chang-Yen DA, et al. (2006), A novel PDMS microfluidic spotter for fabrication of protein chips and microarrays, J. Microelectromech. Syst. 15, 1145-1151.
Chen S, Doolen GD. (1998), Lattice Boltzmann method for fluid flows, Annu. Rev. Fluid. Mech. 30, 329-364.
Chen C-S, et al. (2008) Shrinky-Dink microfluidics: 3D polystyrene chips. Lab Chip. 8, 622.
Chen IJ, Lindner E. (2007) The Stability of Radio-Frequency Plasma-Treated Polydimethylsiloxane Surfaces. Langmuir. 23(6), 3118.
Chiu DT, et al. (2000) Patterned deposition of cells and proteins onto surfaces by using three-dimensional microfluidic systems. Proc. Natl. Acad. Sci. U.S.A., 97(6) 2408-2413.
Chiu DT, et al. (2001) Using three-dimensional microfluidic networks for solving computationally hard problems. Proceedings of the National Academy of Sciences. 98(6), 2961.
Clime L, et al. (2009) Microfluid. Nanofluid. DOI: 10.1007/s10404-10009-10491-10409.
Duffy DC et al. (1999) Electroluminescent Materials with Feature Sizes as Small as 5 µm Elastomeric Membranes as Masks for Dry Lift-Off. Adv. Mater. 11(7), 546.
Eddings MA et al, (2008) Anal. Biochem. 382, 55-59.
Eddings MA, et al. (2009) Anal. Biochem. 385, 309-313.
Geissler M, et al. (2009a) Stretching the Stamp: A Flexible Approach to the Fabrication of Miniaturized DNA Arrays. Small. 5(22), 2514-2518.
Geissler M, et al. (2009b) Microfluidic patterning of miniaturized DNA arrays on plastic substrates, ACS Appl. Mater. Interfaces. 1, 1387-1395.
Griscom L, et al. (2001), Cell placement and neural guidance using a three-dimensional microfludic array, Jpn. J. Appl. Phys. 40, 5485-5490.
Haraldsson KT, et al. (2006) 3D polymeric microfluidic device fabrication via contact liquid photolithographic polymerization (CLiPP). Sensors and actuators. B, Chemical. 113, 454.
Heckele M, Durand A. (2001) Microstructured through-holes in plastic films by hot embossing. Proceedings of 2nd international conference of the European society for precision engineering and nanotechnology. p. 196.
Heckele M, et al. (2006) Replication and bonding techniques for integrated microfluidic systems. Microsystem Technology. 12, 1031.
Heo YS, et al. (2007) Characterization and Resolution of Evaporation-Mediated Osmolality Shifts That Constrain Microfluidic Cell Culture in Poly(dimethylsiloxane) Devices. Anal. Chem. 79(3), 1126.
Hofmann O, et al. (2002), Three-dimensional microfluidic confinement for efficient sample delivery to biosensor surfaces. application to immunoassays on planar optical waveguides, Anal. Chem. 74, 5243-5250.
Hutchison JB, (2004) Robust polymer microfluidic device fabrication via contact liquid photolithographic polymerization (CLiPP). Lab Chip. 4, 658.
Jeon NL, et al. (2002) Design and Fabrication of Integrated Passive Valves and Pumps for Flexible Polymer 3• . Dimensional Microfluidic Systems. Biomed. Microdevices. 4(2), 117.
Jo B-H, et al. (2000) Three-Dimensional Micro-Channel Fabrication in Polydimethylsiloxane (PDMS) Elastomer. J. Microelectromech. Syst. 9(1), 76.
Juncker D, et al. (2002), Autonomous microfluidic capillary system, Anal. Chem. 74, 6139-6144.
Juncker D, et al. (2005), Multipurpose microfluidic probe, Nat. Mater. 4, 622-628.
Kartalov EP, et al. (2006) Microfluidic vias enable nested bioarrays and autoregulatory devices in Newtonian fluids. PNAS. 103(33), 12280.
Kikutani Y, et al. (2002) Glass microchip with three-dimensional micro channel network for 2×2 parallel synthesis. Lab Chip. 2, 188.
Kim JY, et al. (2005) Automatic aligning and bonding system of PDMS layer for the fabrication of 3D microfluidic channels. Sens. Actuators, A. 119, 593.
Kloter U, et al. (2004) Technical Digest of the 17th IEEE International Conference on Micro Electro Mechanical Systems. pp. 745-748.
Lee JN, et al. (2003) Solvent Compatibility of Poly(dimethylsiloxane)-Based Microfluidic Devices. Anal. Chem. 75(23), 6544.
Liu RH, et al. (2000) Passive mixing in a three-dimensional serpentine microchannel. J. Microelectromech. Syst. 9(2), 190.
Luo Y, et al. (2008) Perforated membrane method for fabricating three-dimensional polydimethylsiloxane microfluidic devices. Lab Chip. 8, 1688.
Maltezos G, et al. (2007) Design and fabrication of chemically robust three-dimensional microfluidic valves. Lab Chip. 7, 1209.
Martin DWM, Bennett WD. (1999) Microfabrication methods for microchannel reactors and separations systems. Chem. Eng. Commun. 173, 245.
Martin PM, Matson DW, Bennett WD, Stewart DC. (2000) Laminated Ceramic Microfluidic Components for Microreactor Applications. Proceedings of the 4th International Conference on Microreaction Technology. vol. 1998.

(56) References Cited

OTHER PUBLICATIONS

Martinez AW, Phillips ST, Whitesides GM. (2008) Three-dimensional microfluidic devices fabricated in layered paper and tape. PNAS. 105(50), 19606.

Mazzeo AD, et al. (2007) Single-step through-hole punching by hot embossing. Annual technical conference—Antec, Conference proceedings. 5, 2931.

Mehne C, et al. (2008) Large-area polymer microstructure replications through the hot embossing process using modular molding tools. Proc. IMechE vol. 222 Part B: J. Engineering Manufacture. 93-99.

Mukhopadhyay R. (2007) When PDMS isn't the best. Anal. Chem. 79(9), 3248.

Natarajan G, Humenik JN. (2006) 3D Ceramic Microfluidic Device Manufacturing. Journal of Physics: Conference Series. 34, 533.

Natarajan P, et al. (2007) Through-thickness embossing process for fabrication of three-dimensional thermoplastic parts. Polym. Eng. Sci. 47, 2075.

Natarajan S, et al. (2008a) Optimal conditions for protein array deposition using continuous flow, Anal. Chem. 80, 8561-8567.

Natarajan S, et al. (2008b), Continuous-flow microfluidic printing of proteins for array-based applications including surface plasmon resonance imaging, Anal. Biochem. 373, 141-146.

Peng Z-C, et al. (2006) CMOS Compatible Integration of Three-Dimensional Microfluidic Systems Based on Low-Temperature Transfer of SU-8 Films. J. Microelectromech. Syst. 15(3), 708.

Romanato F, et al. (2004) X-ray lithography for 3D microfluidic applications. Microelectron. Eng. 73-74, 870.

Ryu W, et al. (2006) Microfabrication Technology of Biodegradable Polymers for Interconnecting Microstructures. J. Microelectromech. Syst. 15(6), 1457.

A letter from associate describing the Office Action for corresponding German Patent Application No. 11 2011 104 891.2 in the English language.

* cited by examiner

 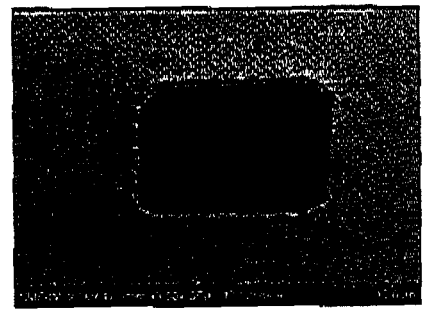
Fig. 2A          Fig. 2B
 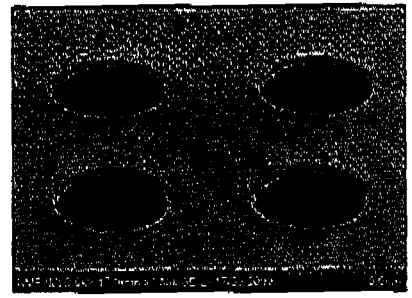
Fig. 3A          Fig. 3B

3D MICROFLUIDIC DEVICES BASED ON OPEN-THROUGH THERMOPLASTIC ELASTOMER MEMBRANES

CROSS-REFERENCE TO RELATED APPLICATIONS

This application is a national phase entry of International Patent Application PCT/CA2011/000154 filed Feb. 15, 2011.

FIELD OF THE INVENTION

The present invention is related to open-through thermoplastic elastomer (TPE) membranes, to methods of producing open-through TPE membranes and to three-dimensional microfluidic devices based on such membranes.

BACKGROUND OF THE INVENTION

The accurate deposition and patterning of biological probes on a solid support is of critical importance to numerous bioassays. For example, protein and DNA microarrays, which offer the interesting possibility to study concurrently the interaction between a target sample and a large number of different biological probes, have become key components of drug discovery, clinical diagnostics, and gene sequencing. However, microarrays still largely depend on detection techniques such as fluorescence labeling or surface plasmon resonance which are difficult to apply in point-of-care applications. Recently, new detection techniques involving integrated sensors with microfabricated biosensing elements have emerged, including: nanowires, field-effect-transistors, optical sensing waveguides, and electrochemical sensors. This new generation of microfabricated biosensor arrays creates a pressing need for the development of techniques that allow the high-quality immobilization of various biological probes with high positional accuracy on the micron-size sensing elements of the chips.

Numerous techniques have been developed for the immobilization of DNA, proteins, cells or other biological probes on a solid surface, including: pin printing, inkjet printing, microstamps, and microfluidics. Pin printing, in which solid metal pins are pressed on a surface to transfer minute amount of liquid, is still a widely used technique due to its relative simplicity and the possibility to pattern arrays with thousands of spots. However, accurate positioning and registration of the spots are difficult to control and require costly and sophisticated tools. Also, rapid and uncontrolled drying of the liquid deposited can lead to non-uniform spots and denaturing conditions, especially when the dimensions of the spots are decreased below about 80 µm.

Microfluidics provides a simple path to better control the immobilization conditions as well as the dimension, positioning, and uniformity of the deposition zone. Microfluidic immobilization devices generally consist of a network of channels patterned in polydimethylsiloxane (PDMS), a thermoset elastomer that can create a reversible conformal sealing to most solid supports. The biological probes are then flown in the device, incubated, and washed, thus giving rise to immobilized patterns matching the geometry of the channels. With this technique, the dimension of the spots is precisely set by the geometry of the channels (spot width of less than 1 µm has been demonstrated) and better control of the immobilization conditions is achieved, which is of critical importance for sensitive biomolecules such as proteins. On the other hand, simple microfluidic devices having a 2D network of channels are inherently limited to pattern continuous features and cannot be used to form an array of isolated spots, as it would be required, for example, to immobilize biological probes only on the sensing elements of a microfabricated biosensor array. Also, because the biological probes are in contact with the activated substrate over the entire length of the 2D microfluidic device, a rapid depletion of the immobilization solution is typically observed during the transport in the channels.

To overcome these limitations, various more complex designs based on a 3D geometry have been proposed. In these designs, the channels are typically embedded inside the microfluidic device and the liquid is brought in contact with the substrate only on the desired locations using open-through holes (e.g. "vias") (Chiu 2000; Griscom 2001; Juncker 2002; Juncker 2005; Kloter 2004; Wang 2006), channels oriented perpendicularly to the substrate (Chang-Yen 2006; Eddings 2008; Natarajan 2008a; Natarajan 2008b; Eddings 2009), or flow confinement effects (Hofmann 2002; Juncker 2005; Eddings 2009).

3D microfluidic immobilization devices have first been demonstrated by Chui et al. who reported the patterning of up to three types of proteins or cells on isolated regions by using a thin PDMS membrane with open-through holes to make connections between two layers of channels (Chiu 2000). Junker et al. also reported 3D microfluidic devices made by etching open-through holes in silicon wafers with deep reactive ion etching (Juncker 2002; Juncker 2005; Kloter 2004). Capillary phenomena were then used as the driving force to pattern of up to 11 independent 50 µm size protein spots on a PDMS substrate. Recently, Gale's and Myszaka's groups designed a multi-layer 3D patterning system based on channels oriented perpendicularly to the substrate allowing up to 48 independent biological probes to be immobilized on isolated spots of about 400 µm size (Chang-Yen 2006; Eddings 2008; Natarajan 2008a; Natarajan 2008b; Eddings 2009).

Sudarsan et al. describes the fabrication of microfluidic devices made of a TPE consisting of a home-developed mixture of SEBS and mineral oil prepared by heating the constituents in vacuum overnight (Sudarsan 2004a, Sudarsan 2004b, Sudarsan 2005). Although a device made from few layers of this TPE was briefly described, no method was unveiled to fabricate devices with a dense array of vias with TPE or to create microscopic open-through holes in such material. In the only example presented, the fluidic connection between the layers was made by simply punching a macroscopic hole manually. This method cannot be used to create complex devices with 3D network of channels.

Stoyanov et al. used thermoplastic polyurethane foils TPU (a specific type of TPE) to fabricate solvent resistant microfluidic devices for the use with a surface acoustic wave sensor chip (Stoyanov 2005; Stoyanov 2006). The foils were patterned by hot embossing and open-through holes were demonstrated. However, no 3D microfluidic devices were demonstrated or discussed. Only two rather large (greater than 300 µm) open-through holes were patterned on the devices and they were used only as an inlet and outlet (not as 3D interconnects or vias). Also the TPU grade used for the experiment (Walopur™ 2201 AU) has shore hardness higher than 85 A, which is too high to provide reversible and conformal sealing on a surface or to allow the demolding of undercut profiles. Also, a high pressure (50-120 bar) was needed to correctly pattern the TPU foils, which prevented the use of low cost photoresist molds and required metallic molds.

Despite these recent developments, many challenges must still be solved before microfluidics can be accepted as a universal biological patterning tool. Existing processes are typically very challenging, labor-intensive, and/or inherently serial. Also, the properties of the materials used in such 3D devices are typically far from ideal. As a consequence, the compatibility of the devices is often limited to only the most standard solvents and complicated and costly steps are required for the patterning and bonding of the multiple layers from which the devices are built. These drawbacks have relegated 3D microfluidics to relatively simple academic prototyping and have largely dissuaded researchers and industries from further research on these methods. As a consequence, despite more than ten years of research since the concept of 3D microfluidics was first demonstrated, microfluidic devices are still today almost exclusively based on network of channels patterned on a single 2D plane.

The most critical issue arguably arises from the intrinsic need to use the microfluidic patterning devices only once to avoid cross-contamination issues. Under such circumstances, the development of high-throughput mass-production processes to achieve low-cost per device is of critical importance. Unfortunately, almost all previous designs of microfluidic patterning devices have relied on PDMS, which is not very amendable to low-cost mass-production. Other drawbacks of PDMS are discussed below. It is also noteworthy that many of the 3D microfluidic designs proposed to date require the precise and difficult alignment of many elastomeric layers over large areas and the use of costly and lengthy post-processing procedures to punch the numerous access holes and cut the devices in final shape.

Approaches to fabricating 3D microfluidic devices can be divided into three categories: (i) layered PDMS microfluidics; (ii) layered microfluidic devices made from hard materials; and, (iii) 3D molding.

Layered PDMS Microfluidics

The most common method of achieving 3D devices involves the fabrication and stacking of several thin open-through layers of PDMS (polydimethylsiloxane), a soft thermoset elastomer. Each individual layer is fabricated either by spin casting uncured PDMS prepolymer on a mold (so that the highest features of the mold breach through the PDMS layer) or by clamping a drop of PDMS prepolymer between a mold and a top plate. The thin PDMS layers are then cured, peeled off from the mold, oxidized in $O_2$ plasma, aligned, and bonded into a 3D microfluidic device.

PDMS is the standard and most widely used material for both 2D and 3D microfluidics. Although it has some very attractive properties such as high transparency, low hardness, elasticity, and relatively low cost, it also shows some serious drawbacks, which have precluded industry adoption of PDMS for mass production. Firstly, as PDMS is a thermoset, it requires lengthy curing and degassing steps, which makes its use very unpractical for mass production. This problem becomes critical for the fabrication of layered 3D devices, as many layers need to be degassed and cured independently for the fabrication of a single device. The thermosetting properties of PDMS also prevent the use of simple techniques such as thermal bonding to assemble the final devices. Indeed, the bonding of PDMS layers typically involves a plasma oxidation step that must be rapidly (less than 1 min) followed by the alignment and bonding of the layers. Another problem is the intrinsic porosity of PDMS and its relatively high gas permeability. As a result, water tends to evaporate quickly through PDMS, which limits the maximum length of an assay and can be critical for applications where osmolality must be carefully monitored (e.g., cellular studies, etc.). This problem is also strongly exacerbated in 3D layered devices due to the use of thin layers of PDMS (typically about 100 µm).

The fabrication of layered 3D devices from PDMS also typically requires manual peeling of the membrane from the molds. This process is not only inherently serial but is also very problematic due to the rather low mechanical strength of PDMS. The PDMS membranes can thus break or deform very significantly during their manipulation, which makes alignment difficult or even impossible. Finally, PDMS is not compatible with a large number of solvents and is thus relegated mostly to water-based chemistry. For example, PDMS will absorb not only hydrocarbon solvents but also some analytes with a slight lipidic character.

Thus, although PDMS is very relevant for prototyping and academic demonstration of concepts, its use for the mass production of complex 3D layered devices is far from ideal.

Layered Microfluidic Devices Made from Hard Materials

A similar layered approach has also been used to fabricate 3D microfluidic devices from the following hard materials: silicon, glass, ceramic, metal, hard thermoplastics, biodegradable polymers, photo curable polymers, photoresists, and paper. Although the fabrication techniques vary greatly depending on the material of interest, they all involve the production of open-through layers and their bonding into a 3D device. Depending on the material, the open-through holes have been obtained by techniques such as drilling, etching, punching, photopatterning, hot embossing, and laser cutting. The layers then have to be bonded into functional 3D devices by using techniques such as thermal bonding, chemical bonding, photoresist curing, or double-sided adhesive tape.

The use of hard materials for layered 3D microfluidics can alleviate some of the problems encountered with PDMS. They however have their own limitations. The most important drawback comes from the rigid nature of these materials. Contrary to elastomeric soft materials, hard materials do not allow reversible and conformal sealing on an arbitrary surface and do not offer the possibility of creating easily implementable valving schemes. Some of materials involved in the fabrication of 3D devices are also not transparent (silicon, ceramic, wax, paper, etc.).

Fabrication of multi-layers 3D devices with hard materials is also typically more problematic than with PDMS. The patterning of inorganic materials such as glass, silicon, metal, and ceramics cannot be performed with low cost rapid prototyping tools. The production costs with these materials are thus generally too high to produce single-use complex 3D devices at reasonable price. The patterning of hard thermoplastics is generally much easier than for hard inorganic materials, but it also presents some issues. It is indeed very challenging to create microscopic open-through holes reliably in hard thermoplastics. For example, with hot embossing, both high pressures and temperatures are required to correctly transfer the pattern of the mold and to punch through a plastic sheet. Under these conditions, it is not possible to use low cost photoresist-based molds (as typically used in PDMS molding), and costly metallic molds must be prepared. The rigid nature of hard thermoplastics also makes demolding difficult or even impossible when high aspect ratio features are required. Various strategies must also be implemented to avoid the presence of a thin residual layer at the top of each open-through hole. The typical scheme requires the use and alignment of a receptor mold with holes corresponding to the protruding features of the embossing mold. It is also possible to use a polymeric sacrificial layer so that the mold features protrude in this second layer and leaves open-through holes in the thermoplastic part.

Finally, it must be stressed that bonding is a difficult problem for most hard materials. It is generally achieved by pressing together the various layers under a specific force and temperature. However, due to the high rigidity of these materials, microscopic defects, surfaces irregularities, or non ideal bonding conditions can easily result in partially bonded section and leaks. As the probability of defect increases with the number of bonded layers, it can be very challenging to produce complex 3D devices in a reliable manner from hard materials. Consequently, bonding techniques are still a very active research area in 3D microfluidics. For example, approaches using double sided tape, or partially cured photoresists have been recently proposed to improve the bonding reliability. Nevertheless, due to their rigid nature, hard materials are not compatible with applications requiring reversible and conformal sealing on arbitrary surfaces.

3D Molding and Direct 3D Fabrication

The third and last approach involves the fabrication of a 3D sacrificial mold containing directly the desired final geometry for the network of channels. The microfluidic device is then fabricated from this 3D mold by using techniques such as metal electroforming or casting of a prepolymer or an epoxy. The final microfluidic device is then released by melting or dissolving the mold. It is to be noted that the mold has to be sacrificed and cannot be reused as soon as the design contains suspended features. The molds are generally fabricated by solid object printing of low fusion temperature materials such as wax. Alternatively, the microfluidic devices can also be fabricated directly by 3D fabrication techniques similar to that used for the fabrication of the 3D sacrificial molds (e.g. stereolithography).

The main advantage of 3D molding and direct 3D fabrication is to eliminate the alignment and bonding steps required in layered fabrication. However, the lengthy and costly process of fabricating either a complex sacrificial 3D mold for each device or each 3D microfluidic device in a serial manner limits this technique to device design and early prototyping. The printed 3D molds also typically have high roughness and a relatively low resolution (about 100 microns). Finally, some types of features, such as long suspended channels, are difficult to create with this approach.

Although proof of concept for microfluidic immobilization of biological probes was obtained more than a decade ago, none of the microfluidic devices proposed to date can clearly combine all the characteristics necessary for widespread adoption of the technology. There remains a need for new methods to build complex 3D microfluidic devices using simple techniques and materials that have appropriate properties for the targeted applications.

SUMMARY OF THE INVENTION

The present invention provides a new technique for patterning open-through membranes for use in the design and fabrication of 3D microfluidic devices.

Thus, there is now provided a process of providing open-through holes in a thermoplastic elastomer (TPE) membrane comprising: (i) providing a mold having protruding features for producing open-through holes in the TPE membrane; (ii) providing a counter-plate to the mold; (iii) providing sufficient TPE material in the mold such that, after processing, the mold cavity is properly filled with the TPE material; (iv) heating the TPE material to a temperature above the softening temperature of the TPE material to soften the TPE material; (v) applying a compressive pressure between the mold and the counter-plate for a sufficient length of time to form and pattern the TPE membrane from the TPE material without permitting the protruding features of the mold to come into contact the counter-plate, thereby ensuring that an excess layer of the TPE material remains between the protruding features and the counter-plate; (vi) cooling the TPE membrane; and, (vii) demolding the patterned TPE membrane whereby the demolding results directly in removal of the excess layer from the TPE membrane to produce the open-through holes in the TPE membrane, the removal of the excess layer being controlled by controlling adhesion between the TPE and the mold or counter-plate.

There is further provided a thermoplastic elastomer (TPE) membrane without significant defects or deformations produced by a process as defined in any one of claims 1 to 19 and having micrometric-sized open-through holes.

There is further provided an open-through thermoplastic elastomer (TPE) membrane comprising open-through holes having a size of 1-200 μm and having 1 or less defects or deformations for every 10 open-through holes in the membrane.

There is yet further provided a 3D microfluidic device comprising a thermoplastic elastomer (TPE) membrane of the present invention.

There is yet further provided use of a thermoplastic elastomer (TPE) membrane of the present invention in a 3D microfluidic device.

Any type and grade of TPE material is useable in the present process. It is an advantage of the present process that low cost commercial grades of TPE that are particularly well adapted to the mass production of layered 3D microfluidic devices can be used. Some examples of suitable TPE materials are styrene-ethylene/butylene-styrene block copolymers (SEBS, e.g. Versaflex™ CL30), ethylene-vinyl acetate copolymers (EVA, e.g. Evatane™), styrene-isoprene-butadiene block copolymers (SIBS), ionomeric TPE, single phase melt processable TPE and blends thereof. The TPE material may further comprise one or more additives, for example, oils (organic or inorganic), tackifiers or mixtures thereof. Oils and/or tackifiers are preferably present in an amount of less that 40% w/w based on the weight of the TPE material. The TPE material may be provided in the mold in any suitable form, for example, an extruded film, pellets, etc. Preferably, the TPE material is provided in the mold as an extruded film. Extruded TPE films provided in the mold have a thickness slightly greater than the height of the protruding features in the mold to ensure the mold cavity is properly filled with TPE.

Due to their low hardness and elastomeric nature, TPE materials can achieve reversible and watertight bonding on most surfaces, and are easily implemented in complex valving schemes. Compared with PDMS, TPE materials offer the additional advantages of lower processing time (no need for curing), high compatibility with high-throughput mass production tools such as hot embossing and injection molding, much lower porosity and gas permeability, easily implementable thermal bonding of multiple layers, better compatibility with hydrocarbon solvents and analytes, higher mechanical strength, higher elasticity, stronger reversible bonding, and ease of storage and use on demand (no need to mix and degas prepolymers just before the fabrication of devices).

The mold may comprise other features in addition to the protruding features for producing open-through holes. Other features may include, for example, features for forming channels, chambers, alignment marks, valves, pumps, mixing regions, etc. Molds may be made of any material suitable for use in the molding of TPE, for example, metal, metal alloy, polymer, polymer composite, etc. Molds comprising polymeric materials are preferred. It is an advantage of the present process that molds can be made of relatively inexpensive polymeric materials, for example photoresist materials (e.g. SU8 photoresist), epoxy polymers, polyimides, elastomeric polymers, etc. The mold may be fabricated with appropriate features by any suitable method depending on the mold material, for example, machining, stamping, die tooling, stereolithography, photolithography, etc.

The counter-plate preferably comprises a hard material, for example metal, metal alloy, silicon, epoxy polymer, polyimide or a heat-resistant plastic that will preferably not deform significantly during the patterning process. Counter-plates comprising silicon are relatively cheap, have very smooth surfaces, and are excellent heat conductors. For large production runs, polished metal counter-plates may be advantageously used. The counter-plate may also comprise a layer of flexible, heat resistant material, for example, polytetrafluoroethylenes. The counter-plate may be flat or it may be structured to achieve double-sided patterning.

The counter-plate may also comprise an elastic layer having a softening temperature above the temperature at which the TPE membrane is formed and patterned. Such an elastic layer is in direct contact with the TPE material during patterning and has sufficient elasticity to transfer a uniform compressive force on the TPE membrane during cooling. This elastic layer is not permanently deformed during processing, but is rather deformed elastically. During patterning, this elastic layer will be elastically (i.e., reversibly) compressed by the processing pressure. This elastic compression will be released locally (i.e. where there is no open-through features) during cooling to compensate for shrinkage of the TPE. The amount of elastic compressive deformation of the elastic layer during processing is generally significantly higher than the amount of shrinkage that the TPE will experience. Thus, the strain in the TPE will always remain compressive, which reduces defects associated with shrinkage. Too high a degree of elastic compression will result in a high local deformation of the TPE membrane around the open-through features. Thus, a thick and soft elastic layer reduces the presence of defects but maximizes deformation around the openings, while a thin and harder elastic layer increases the risk of defect formation but minimizes deformation. Therefore, the ideal characteristics of the elastic layer (e.g. Young's modulus and thickness) depend on many parameters including grade of TPE, processing temperature, density of open-through holes, etc.

The presence of the elastic layer thus helps to reduce localized shrinkage of the TPE membrane during cooling, which reduces the appearance of defects, such as sink marks, in the TPE membrane. The elastic layer has a Young's modulus that is low enough to provide enough local elastic deformation to fully compensate for the shrinkage of the TPE. Preferably, the Young's modulus of the elastic layer is in a range of from 0.01 MPa to 100 MPa. The elastic layer preferably comprises a thermoset rubber (e.g. polydimethylsiloxane (PDMS)) or a thermoplastic elastomer having higher softening temperature than the temperature at which TPE patterning is carried out. The elastic layer is preferably relatively thin compared to the rest of the counter-plate, although in some applications it is possible to replace the counter-plate with a bulk layer of elastic material directly in contact with the TPE. Preferably, the elastic layer has a thickness of about 300 µm or less, more preferably about 25-300 µm, for example about 100 µm. Preferably, the adhesion force between the elastic layer and TPE is controlled to facilitate removal of the excess layer from the TPE membrane during demolding, while still enabling easy removal of the molded TPE membrane.

It is well known in the art that a thick (several mm) layer of rubber can be placed in contact with one (or both) of the metal plates of an embossing system to compensate for misalignment or permanent bending/non-uniformities of the tool. This layer of rubber ensures that such permanent deformations of the tool do not significantly affect the embossing process. The presently described use of an elastic layer is significantly different compared to the previous prior art. Contrary to the present invention, the prior art layer of rubber is not in contact with the thermoplastic material being patterned, but is rather placed either between the counter-plate and the tool or between the mold and the tool. It is thus impossible to compensate for local shrinkage of TPE with this prior art technique. Also, in the present process, the elastic layer is generally not thick enough to compensate for macroscopic deformation of the tool, but rather provides compressive force locally to the TPE membrane.

To form and pattern the TPE material in the mold, the TPE material is heated to a temperature above the softening temperature (glass transition temperature ($T_g$)) of the TPE material in order to soften the TPE material. Preferably, processing temperature is lower than the decomposition temperatures of the TPE material. Also, for block copolymer TPE, processing temperature is preferably 30° C. or more above $T_g$ of the soft rubbery phase of the TPE, while for random copolymer TPE, processing temperature is preferably 5° C. or more above the $T_g$ of the TPE. After softening the TPE material sufficiently, a compressive pressure is applied between the mold and the counter-plate for a sufficient length of time to form and pattern the TPE membrane from the TPE material without permitting the protruding features to come into contact the counter-plate. The compressive pressure may be applied with any suitable equipment, for example, a metal tool assembly, a hydraulic source, from pressurized fluid (air or liquid), etc. Hot embossing equipment and techniques may be used (e.g. an EVG520, EVG750 systems (EV Group, Schärding, Austria) using standard levels of applied force (e.g. 1-100 kN) and ambient pressure (e.g. $10^{-3}$ to $10^{-1}$ mbar). At no time do the protruding features of the mold penetrate all the way through the TPE to counter-plate. A thin excess layer of TPE is left between the protruding features and the counter-plate. This excess layer is preferably less than 1 µm thick, for example 0.01-1 µm.

Adhesion of TPE to the mold and counter-plate may be controlled, if desired, by surface treating the mold and/or counter-plate with one or more adhesion modifiers (e.g. adhesion inhibitors) to ensure that the membrane stays on the counter-plate (or the mold if desired) during initial demolding. Adhesion inhibitors include, for example, fluoropolymers (e.g. polytetrafluoroethylenes), silanes (e.g. 1H,1H,2H,2H-perfluoro-octyltrichlorosilane), cytop, etc. Surface treatment may be accomplished by any suitable means, for example, spin-coating, spray coating, dip coating, self-assembled monolayer, vapor deposition, reactive ion etching, sputtering and electron-beam, followed by annealing if required. In a preferred embodiment, the mold is treated with an adhesion inhibitor so that the TPE membrane sticks to the counter-plate during initial demolding.

When demolding is completed by removing the TPE membrane from the counter-plate, adhesion of the thin excess layer to the counter-plate will result in the removal of the excess layer from the open-through holes of the TPE membrane. When an elastic layer is included in the counter-plate, the thin excess layer of TPE will adhere to the elastic layer when the TPE membrane is removed from the elastic layer. In another embodiment, the TPE membrane can stick to the mould rather than the counter-plate during initial demolding. Adhesion of the thin excess layer can also occur to either the top of the protruding features of the mould or to the counter-plate plate so as to result in the removal of the excess layer from the open-through holes when the TPE membrane are removed from the mould or the counter-plate.

Open-through thermoplastic elastomer (TPE) membranes of the present invention comprise open-through holes (e.g. vias, inlets, outlets, etc.) and other features (e.g. channels, chambers, valves, etc.) of micrometric size. The open-through holes and other features may be of any size and can be advantageously as small as about 1000 µm or less, about 1-500 µm or even about 1-200 µm without having significant defects or deformations. Sizes of about 1-50 µm without significant defects or deformations are possible. The number of defects or deformations in the membrane is advantageously 1 or less for every 10 open-through holes or other features in the membrane, and may be 1 or less for every 50, or even may be 1 or less for every 100, or even may be 1 or less for every 500. Advantageously, the number of defects or deformations noted above may be based on the number of open-through holes or other features having a size of about 200 µm or less. Membrane thickness may also be micrometric. Membrane thickness may be about 1000 µm or less, for example about 1-500 µm or about 1-200 µm. Aspect-ratio of a hole or other feature is a ratio of height to width. For open-through holes, hole height is essentially the same as membrane thickness. Aspect-ratios (i.e. ratio of height to width) of the open-through holes and other features may be in the range of about 200:1 to 1:1000, for example about 1:10 to 10:1. Long narrow holes or other features have aspect ratios of about 200:1 to 1:1, while short wide holes or other features have aspect ratios of 1:1 to 1:1000. It is an especial advantage of the present invention that long narrow open-through holes or other features can be formed without significant defects or deformations.

Open-through hole and other feature density may be similarly in the micrometric range. Thus, arrays of open-through holes and other features having spacing on the order of about 1-50 µm, or even about 1-20 µm, for example about 5-10 µm, is possible. Open-through holes and other features can have any desired shape (e.g. round, ellipsoidal, triangular, square, rectangular, polygonal, etc.) and profile (e.g. undercut, overcut, irregular, etc.). Due to the high elasticity of the TPE membranes, porosity of the open-through membrane and shape of the open-through holes and other features in the membrane may be reversibly tuned by stretching the TPE membrane. Such tuning is possible over a large range (up to 1000%) after initial patterning of the membrane by appropriate use of mechanical, electrical or magnetic forces.

Open-through thermoplastic elastomer (TPE) membranes are particularly suitable for use in microfluidic devices, especially 3D microfluidic devices. Microfluidic devices comprising such membranes include, for example, microfluidic immobilization devices, microfluidic spotters, mixing devices, check valves, concentration gradient generators, inertial focusing devices, magnetic trapping devices, polymerase chain reaction devices, devices with a high density of inlets or outlets, etc. Such devices find application in a variety of domains, including, detection of toxics gases, explosives, and pathogens, biomarker discovery, fabrication of microarrays (e.g. DNA, RNA, proteins, cells, etc.), combinatorial chemistry, clinical and medical diagnostics, and environmental and food safety. Open-through thermoplastic elastomer membranes also find application in various other fields, for example for soft lithography (shadow masking, patterning of materials, biomolecule and cells, patterned electrodeposition, etc.), filtration (e.g. filters pore sizes that can be tuned by stretching the membranes), stretchable scaffolds (e.g. for the alignment of tubes or optical fibers), etc.

The present process permits rapid, reliable and efficient patterning of densely packed and arbitrarily placed micrometric open-through holes and channels of high aspect-ratio and any shape or wall profile in thin TPE membranes. The process can be integrated readily into existing hot embossing processes to permit mass production of complex 3D microfluidic devices at low cost in a single or successive fabrication steps, while ameliorating one or more of the material compatibility and mass production issues discussed above. Advantageously, the present process is single step, and does not require alignment of the mold and counter-plate. This contrasts with the patterning of open-through holes in most hard thermoplastics (TP) where complicated hot-embossing setups, alignment procedures, and post-processing steps are typically required to punch holes (e.g. see Worgull 2009). Further, the TPE patterning process described herein can be readily integrated into a single process for the fabrication and assembling of open-through membranes into 3D layered microfluidic devices.

Indeed, during the patterning of a TPE membrane by a process of the present invention, the thickness of the excess layer that is present at the top of each open-through hole is rapidly reduced to the point where the excess layer separates systematically during demolding. Thus, open-through holes can be achieved in TPE at pressures and temperatures that are compatible with low cost photoresist-based molds and without the use of a receptor mold (Mazzeo 2007) or of a sacrificial layer of polymer (Heckele 2001; Heckele 2006; Schift 2006). The high elasticity and low elastic modulus of TPE ease demolding of high aspect-ratio and undercut features and protects the molds from the thermal stress present in the patterned membranes. This process thus enables the fabrication of micrometric open-through holes with arbitrarily wall profiles which can also be easily changed by an elastic deformation of the TPE materials. This provides a key advantage for the fabrication of 3D layered microfluidic devices with interconnects of arbitrary shape and adjustable porosity. Further, the present process can be performed in a highly parallel fashion and requires no manual manipulation of the TPE membranes to fabricate and assemble 3D microfluidic devices.

The use of thermoplastic elastomers (TPE) rather than thermosetting polymers such as PDMS presents some significant advantages for the fabrication and assembly of open-through membranes. For example, the starting material (i.e., either pellets or pre-extruded rolls of TPE) can be stored for extend periods and used on demand while thermosetting materials require incessant preparation (mixing, degassing, casting, etc.) of new prepolymer solutions. These extra processing steps, combined with the extra time required for the curing of the prepolymer, complicate significantly the use of thermosets in mass-production of microfluidic devices. Also, either reversible or permanent bonding of a TPE membrane to another TPE material or another material can be easily achieved without pre-treatment of the membranes. The stickiness of TPE permits bonding of two TPE membranes that may then be pealed apart. Alternatively, by rapid (a few minutes) and pressure-free thermal bonding, a permanent bond may be formed, while for PDMS, an $O_2$ plasma treatment typically needs to be performed immediately before the two membranes are aligned and pressed together in order to form a bond. Alternatively, proper selection of TPE materials permits permanent bonding of TPE membranes to TPE or other materials at room-temperature in a few hours without applying pressure. Finally, the surfaces of TPE membranes may be made permanently hydrophilic allowing self-sustained fluid flow and fluid connection between multiple fluidic levels.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 2A depicts a scanning electron microscopy (SEM) side view cross-section micrograph of a 90 μm thick TPE membrane with an array of 30 μm wide and 90 μm tall square-shaped open-through holes produced in the membrane by a process of the present invention;

FIG. 2B depicts a scanning electron microscopy (SEM) top view micrograph of one of the open-through holes depicted in FIG. 2A;

FIG. 3A depicts a scanning electron microscopy (SEM) side view cross-section micrograph of a 90 μm thick TPE membrane with an array of 10 μm diameter and 90 μm tall round open-through holes produced in the membrane by a process of the present invention;

FIG. 3B depicts a scanning electron microscopy (SEM) top view micrograph of one of the open-through holes depicted in FIG. 3A;

DESCRIPTION OF PREFERRED EMBODIMENTS

Materials and Methods

Figure 1:
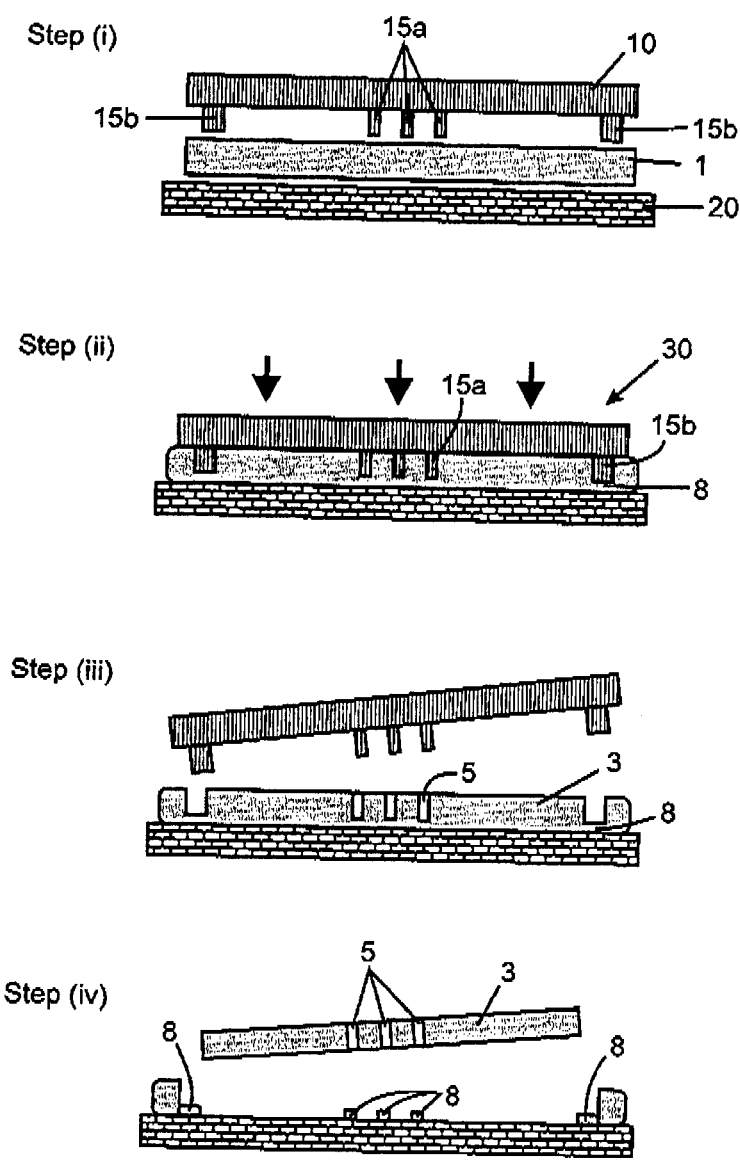
FIG. 1 is a side-view schematic diagram depicting an embodiment of the patterning process of the present invention for providing open-through holes in a TPE membrane.

Membranes and microfluidic devices described in the Examples were fabricated either in Versaflex™ CL30 (from GLS corporation, McHenry, Ill., USA), a melt-processable elastomer based on styrene-ethylene/butylene-styrene block copolymer, or in Evatane™ 42-60 (from Arkema corporation, Colombes, France) a melt-processable elastomer based on ethylene-vinyl random copolymer. Throughout the Examples, the term TPE refers to either Versaflex™ CL30 or Evatane™ 42-60. Versaflex™ CL30 and Evatane™ 42-60 pellets as received were extruded at a temperature of 165° C. and 120° C., respectively, to form films several meters long with thicknesses of about 90 µm, 140 µm or 240 µm.

Molds were prepared by patterning one or two layers of spin-coated SU8 photoresist (GM1060 and GM1075; Gersteltec, Pully, Switzerland) on 100 mm diameter silicon wafers using standard photolithography processes (Geissler 2009b). Photoplotted films printed at a resolution of 65,000 dpi (Fineline Imaging, Colorado Springs, Colo., USA) were used as the photolithography masks. After the patterning of the SU8 features, an anti-adhesive treatment was applied on the molds by spin-coating a thin layer of Teflon™ AF (DuPont, Wilmington, Del., USA) and post-annealing at 200° C. for 2 h.

For the fabrication of the microfluidic devices, a piece of TPE was cut from the extruded film with scissors and placed between the mold and a counter-plate. The counter-plate comprised a silicon wafer coated with either 1H,1H,2H,2H-perfluoro-octyltrichlorosilane (Sigma-Aldrich, St. Louis, Mo., USA) deposited from the vapor phase under reduced pressure, or a thin elastic layer of PDMS (Sylgard™ 184, Dow Corning Corp., Midland, Mich., USA) deposited by spin-coating a degassed prepolymer solution and curing at 200° C. for 2 h as a flexible layer. Hot-embossing was performed with an EVG520 system (EV Group, Schärding, Austria) at a temperature of 170° C. for Versaflex™ Cl30 and 110° C. for Evatane™ 42-60, an applied force of 10 kN, and a ambient pressure of $10^{-2}$ mbar. The oxygen plasma treatments (Plasmalabs™ 80plus, Oxford Instruments, Bristol, UK) were performed for 4 min at a pressure of 50 mTorr and $O_2$ flow rate of 20 sccm. Scanning electron microscopy (SEM) images were acquired with a Hitachi S-4800 (Hitachi High-Technologies Canada, Toronto, ON) and optical micrographs with a Nikon Eclipse L150 microscope (Nikon Instruments, Melville, N.Y.). Microfabrication steps and device assembly were performed in class 1000 clean room facility.

Numerical simulations were performed using a home-developed code based on the Lattice-Boltzmann method with a two-phase three-dimensional D3Q19 scheme driven by a Shan-Chen-type mesoscopic potential (Chen 1998; Clime 2009). The contact angle of the liquid with the surface of the spotting devices was set to a value of about 56° by adjusting the solid-liquid interaction potential. No external force was applied on the liquid.

Protein and DNA immobilization assays were performed on Zeonor 1060R (Zeon Chemicals, Louisville, Ky.) substrates fabricated by an injection molding process. Before the immobilization assays, the Zeonor slides were exposed to an ozone treatment for about 15 min using an Ozo 2vtt ozone generator (Ozomax, Shefford, QC, Canada). They were then incubated in a freshly prepared solution of 17 µM N-hydroxysuccinimide (NHS; Sigma-Aldrich) and 42 µM 1-ethyl-3-[3-dimethyl-aminopropyl]carbodiimide hydrochloride (EDC; Sigma-Aldrich) for 90 min, rinsed and blown dry with a stream of nitrogen. As received amino-modified 27-mer oligonucleotide solutions labeled with Cy3 or Cy5 fluorophore (Integrated DNA Technologies, Coralville, Iowa) were first diluted to 40 µM in $H_2O$. This solution was then diluted 1:1 v/v with dimethyl sulfoxide (DMSO; Sigma-Aldrich) for the DNA immobilization assays. Mouse immunoglobulin G (IgG), rabbit IgG, Cy3-labeled sheep anti-mouse IgG, and Cy5-labeled goat anti-rabbit IgG were purchased from Jackson ImmunoResearch Laboratories (West Grove, Pa.) and were diluted to their final concentration in phosphate buffered saline (PBS, pH 7.4, Sigma-Aldrich).

For the immobilization assays, fabricated 3D layered TPE microfluidic spotting devices were first placed on freshly activated Zeonor slides. The TPE microfluidic devices were found to conform spontaneously to most flat surfaces, thus providing a reversible watertight sealing to the Zeonor substrates without the need to apply additional pressure or heat. The immobilization solutions were placed on the selected inlets of the fabricated microfluidic devices using a pipette. After 2 h of incubation in humid environment at room-temperature, the Zeonor substrates were first immerged in a solution of 0.1% sodium dodecyl sulfate (SDS; Sigma-Aldrich) in PBS in which the microfluidic devices were peeled-off from the substrate. The Zeonor substrate was then washed in a new bath of 0.1% SDS in PBS for 5 min and rinsed in water. The microfluidic devices were used only once to avoid cross-contamination issues. Before hybridization, the Zeonor substrates were blocked using a solution of 1 mg/ml bovine serum albumin (BSA; Sigma-Aldrich) in PBS for 15 min at room-temperature. For the hybridization, a 10 µl drop of the target solution was spread on top of the Zeonor substrate using a glass cover slip. After incubation times of respectively 5 min and 30 min for the protein and the DNA assays, the cover slip was removed and the Zeonor substrate was rinsed in PBS and water. An Eclipse TE2000-U inverted fluorescence microscope (Nikon Instruments) equipped with an EM-CCD camera (Hamamatsu, Bridgewater, N.J.) was used to characterize the immobilized DNA and proteins labeled with Cy3 or Cy5 fluorophores.

Example 1

Fabrication of TPE Membranes with Micrometric Open-Through Holes

FIG. 1 illustrates schematically a process of the present invention for the fabrication of TPE membranes with open-through holes. As shown in FIG. 1 step (i), pre-extruded sheet 1 of TPE is first placed between mold 10 and flat counter plate 20. The TPE sheet has a thickness that almost matches or exceeds slightly that of highest features 15a,15b of the mold. The highest features include features 15a for producing open-through holes in the membrane and features 15b for cutting the membrane produced during hot embossing. As shown in FIG. 1 step (ii), assembly 30 is then heated to a temperature where the TPE is sufficiently softened and then pressed until the highest features of the mold nearly reach the counter plate, leaving only a submicron thick excess layer 8 of TPE between the highest features and the counter-plate. The thickness of excess layer 8 in FIG. 1 is exaggerated for clarity. As shown in FIG. 1 steps (iii) and (iv), on demolding, since this TPE excess layer 8 is thin enough, it detaches and separates systematically when formed TPE membrane 3 is removed from counter-plate 20, thus giving rise to open-through features 5 in membrane 3. Different surface treatments applied on the mold and counter-plate ensures that the open-through TPE membranes remain on the counter-plate during demolding (FIG. 1 step (iii)). The mold can thus be immediately used for another run and the counter-plate can then provide a hard carrier to facilitate the manipulation of the membranes in subsequent post-processing steps. As illustrated in FIG. 1, this technique also permits the cutting of the membranes during the patterning step by placing features 15b around each device on the mold. Using a 100 mm diameter mold, it is possible to routinely pattern and precisely cut up to 32 TPE membranes of 1×1 cm, each having multiple open-through holes, in a single step process.

FIG. 2A shows a scanning electron microscopy (SEM) micrograph of an array of 30 µm wide and 90 µm tall square-shape open-through holes patterned in TPE by the above process using a mold fabricated with SU8 photoresist. The open-through holes have a 3 to 1 aspect-ratio. FIG. 2B shows a top view of one of the open-through holes. The features of the membrane are well defined and no visible excess TPE layer or deformation is seen around the open-through holes.

FIG. 3A shows a scanning electron microscopy (SEM) micrograph of an array of 10 µm diameter and 90 µm tall round open-through holes patterned in TPE by the above process using a mold fabricated with SU8 photoresist. The open-through holes have a 9 to 1 aspect-ratio. FIG. 3B shows a top view of one of the open-through holes. The features of the membrane are well defined and no visible excess TPE layer or deformation is seen around the open-through holes.

Figure 4A:
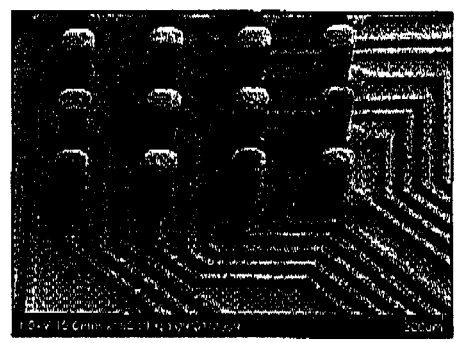
FIG. 4A and FIG. 4B depict SEM micrographs of an SU8 mold after two hot embossing runs, where the mold has both thick protruding features used to pattern open-through holes and thin features to pattern channels.
Figure 4B:
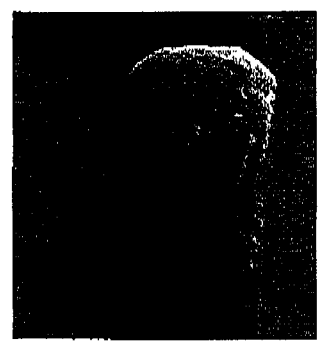
Figure 4C:
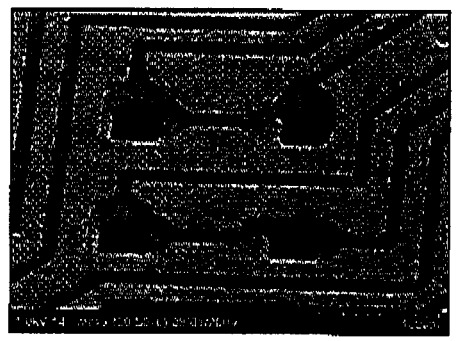
FIG. 4C is a SEM micrograph depicting a bottom view of a TPE membrane with open-through holes made by a patterning process of the present invention with the mold depicted in FIGS. 4A and 4B.
Figure 4D:
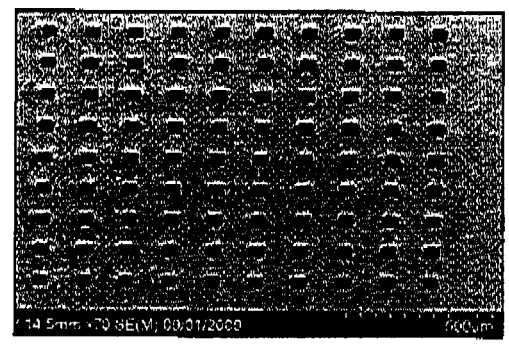
FIG. 4D is a SEM micrograph depicting a top view of a TPE membrane with open-through holes made by a patterning process of the present invention with the mold depicted in FIGS. 4A and 4B.

FIG. 4A and FIG. 4B show an SU-8 mold with 100 µm thick and 50 µm wide pillars and 10 µm thick channels. The corresponding open-through TPE membrane after two hot embossing runs and demolding is shown in FIG. 4C and FIG. 4D. No damage is seen on the mold despite the significant undercut profile of the pillars, therefore, this mold could be reused for numerous hot embossing runs of open-through TPE membranes despite the significant undercut profile of the pillars.

By using a TPE sheet of the appropriate thickness as the starting material, it is possible to obtain open-through holes in less than 10 minutes embossing time by applying a relatively low force of 10 kN on the 100 mm diameter mold. Although shorter dwell time could be achieved at higher forces, this low force permits to use repeatedly the SU8 photoresist-based molds, thus eliminating the need for preparation of costly metallic molds. This demonstrates that a dense array of high aspect-ratio open-through holes in TPE membranes can be achieved with low-cost molds based on SU8 photoresist.

Example 2

Reducing Appearance of Defects in Open-Through TPE Membranes During Fabrication

Figure 5A:
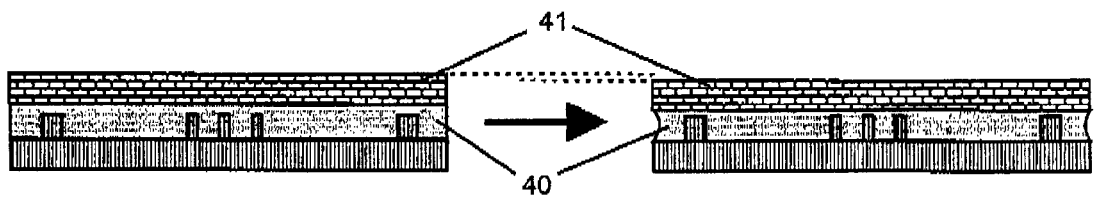
FIG. 5A depicts a schematic diagram showing patterning of TPE without open-through features.
Figure 5B:
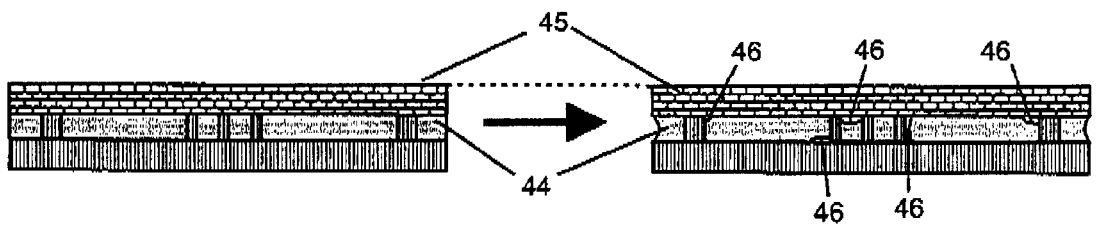
FIG. 5B depicts a schematic diagram showing the patterning of TPE with open-through features where stresses caused by shrinkage of TPE membrane during cooling causes defects.
Figure 5C:
FIG. 5C depicts a SEM micrograph showing an example of the defects that can appear during cooling after patterning open-through TPE membranes.

Although the present process provides considerable benefits to the ease of patterning TPE, further improvement with respect to systematically improving the quality of the open-through TPE membranes would be beneficial. Stresses caused by the relatively high shrinkage (1-2%) of the TPE membrane during the cooling step can cause the appearance of defects when open-through holes are punched in the membranes. This is in contrast to hot embossing of TPE where open-through holes are not produced. FIG. 5A depicts a schematic diagram showing the patterning of TPE without open-through features. Stresses produced by shrinkage of TPE membrane 40 during cooling are relieved by vertical movement of counter-plate 41. In contrast, FIG. 5B depicts a schematic diagram showing the patterning of TPE with open-through features where counter-plate 45 cannot compensate for shrinkage of TPE membrane 44 during cooling and the stresses caused by this shrinkage leads to defects 46. FIG. 5C depicts a SEM micrograph showing an example of the defects that can appear during cooling after patterning open-through TPE membranes.

Figure 5D:
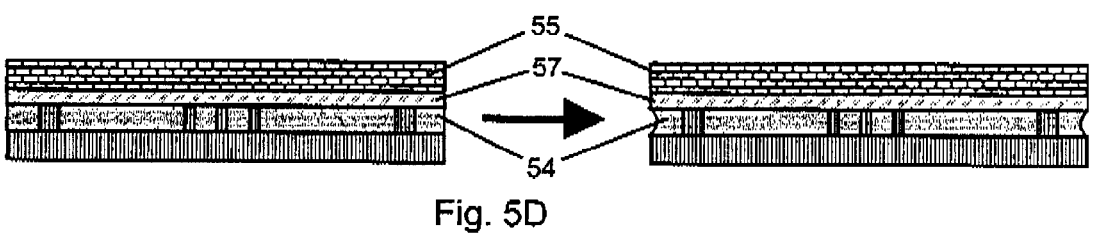
FIG. 5D depicts a schematic diagram showing the patterning of TPE with open-through features where a 100 μm thick elastic layer of PDMS is used to relieve stresses caused by shrinkage of TPE membrane during cooling.
Figure 5E:
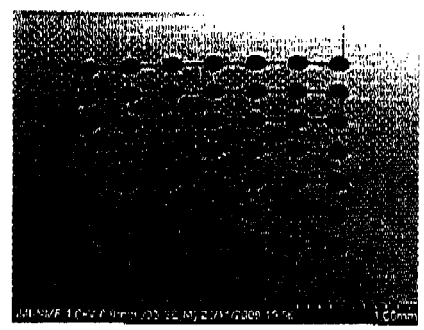
FIG. 5E depicts a SEM micrograph showing an example of the an open-through TPE membrane obtained from the process shown in FIG. 5D.

As shown in FIG. 5D, to reduce the appearance of these defects, thin elastic layer 57 of a thermoset rubber (e.g. a 100 µm thick layer of PDMS) can be placed between counter-plate 55 and TPE membrane 54, with the elastic layer in direct contact with the TPE membrane. The presence of this elastic layer helps to compensate for the shrinkage of the TPE membrane during cooling, which reduces the appearance of defects in the TPE membrane. FIG. 5E depicts a SEM micrograph showing an example of an open-through TPE membrane obtained from the process shown in FIG. 5D. The membrane shown in FIG. 5E does not have defects.

The process disclosed herein is significantly different than known processes for producing open-through holes in hard thermoplastic polymers (TP). As described on pages 152-161 of Worgull 2009, many techniques have been developed to pattern open-through holes in hard thermoplastics by hot embossing. For example, a polymer layer and a metal film, with the metal film in contact with the polymer being molded can be placed on the counter-plate plate. As Worgull indicates, by this technique it is possible to keep the residual layer in large contact surfaces, for example, at the margin regions of the mold insert, and to break the residual layer in small contact areas (e.g. the features for making open-through holes) so as to displace it completely into the layers placed on the counter-plate. These techniques thus rely on the permanent deformation of the layers placed on the counter-plate to break and remove the residual layer above each open-through hole. In the process disclosed herein, the adhesion of TPE to the counter-plate is rather used to directly break the residual layer during demolding without the need to create permanent deformation in layers placed on the counter-plate. This has several advantages compared to previous art. First, in the previous art, one problem arises from the deformation of the flexible layer and the metal foil during the molding process. The mold inserts leave markers on the metal foil after successful molding of through-holes, which makes it impossible to use the metal foil twice. Also, the polymer layer (e.g., PTFE or PVDF) tends to deform under high load by flow processes. The second problem is in guaranteeing the demolding by adhesion of the residual layer on the substrate plate. Because of the missing adhesion of the typically thin residual layer on the metal foil, the replicated part has to be demolded manually, which can damage the structures. The process of the present invention suffers from neither of these two problems of the prior art.

The use of an elastic layer on the counter plate is also significantly different from the previous art. As the elastic layer is made of a thermoset rubber and the patterning process does not result in the highest features of the mold actually punching all the way through the TPE into the elastic layer, the elastic layer is not deformed permanently or damaged during the process and can thus be reused for several runs. Also, the permanent and irreversible plastic deformation that occurs in the layers used in previous art cannot provide the required uniform compressive force to the TPE layer, so that defects caused by TPE shrinkage could still be observed in the TPE membranes. By contrast, the elastic compression of the elastic layer can be released locally (i.e. where there is no open-through features) during cooling to compensate for shrinkage of the TPE.

Example 3

Fabrication and Assembly of Open-Through TPE Membranes in a 3D Layered Microfluidic Device A highly integrated 3D layered microfluidic spotter provides an example of a 3D microfluidic device based on open-through TPE membranes. The 3D micrometric patterning capability of the present process was used to produce a device that can bring liquid in contact only at some specific regions of a given substrate and that integrates a high density of inlet and outlets on a small footprint.

Figure 6:
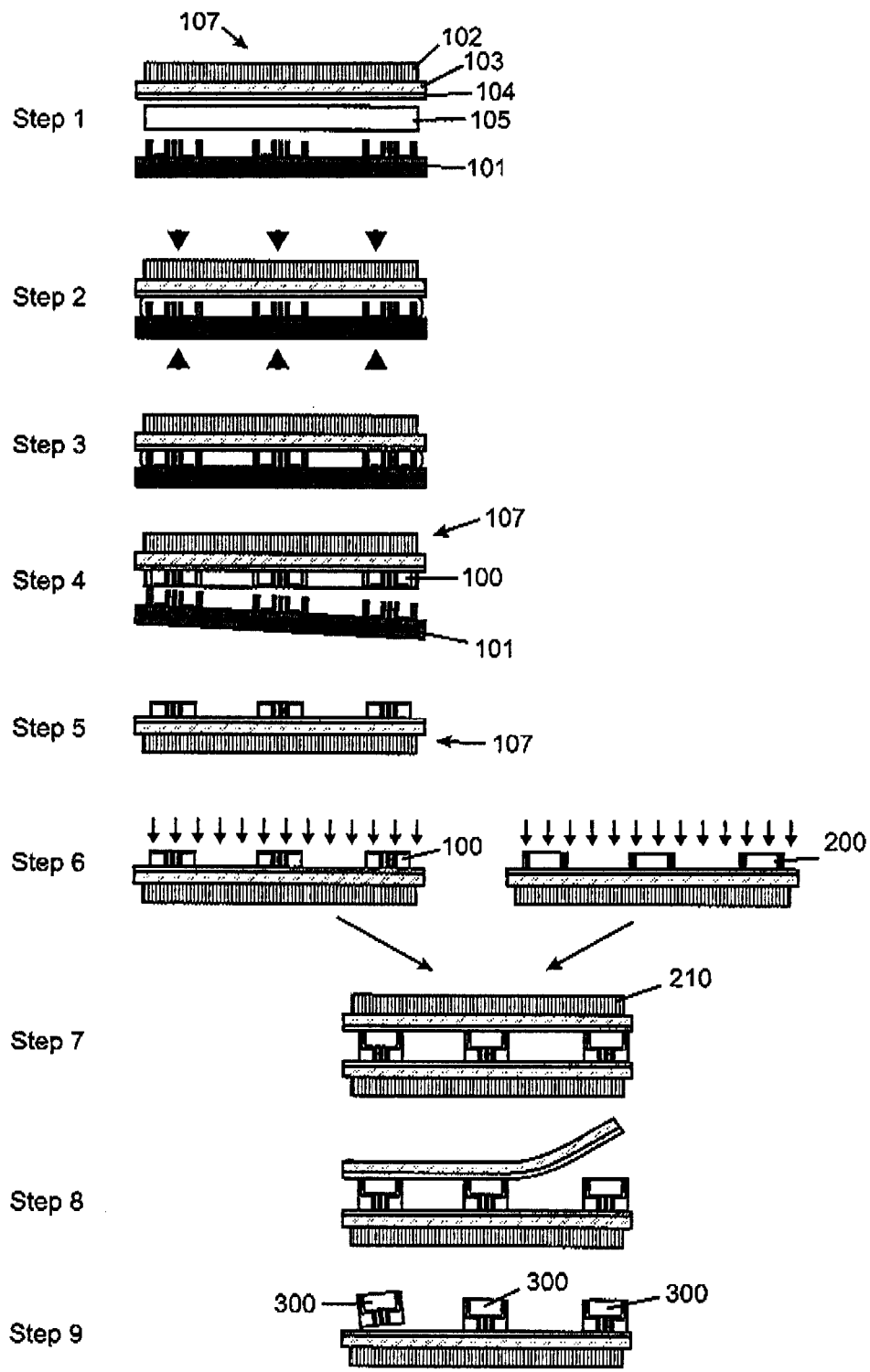
FIG. 6 is a schematic diagram depicting a process to fabricate and assemble open-through membranes in 3D layered microfluidic spotting devices.

FIG. 6 is a schematic diagram summarizing an overall process for producing several 3D layered microfluidic spotters in one process. In the process, first open-through TPE membrane 100 is produced to contain elements that function as applicator heads for the spotter. Fabrication steps for the first membrane are shown on the left side of FIG. 6 (Steps 1-5). Second open-through TPE membrane 200 is produced to contain elements that function as spotting holes for the spotter and is fabricated in a similar manner as the first membrane. Fabrication steps for the second membrane are left out of FIG. 6 for clarity. After producing the membranes, the first and second membranes are surface treated (if desired), aligned and assembled (Steps 6-9 in FIG. 6) to form 3D layered microfluidic spotters 300.

In more detail with reference to FIG. 6, to fabricate first open-through membrane 100, a mold assembly is provided in Step 1. The mold assembly comprises mold 101, counter-plate 107 and extruded TPE sheet 105 to be formed and patterned between the mold and counter-plate. The mold comprises SU8 photoresist and contains features for making open-through holes and features required to pattern several devices simultaneously (e.g. wall features). The mold is covered with an anti-sticking coating of Teflon™. The counter-plate comprises hard silicon wafer 102, flexible high $T_g$ heat resistant Teflon™ sheet 103 and thin elastic PDMS layer 104. PDMS layer 104 is in direct contact with TPE sheet 105. The TPE sheet is pre-extruded and has a thickness close to the highest features of the mold.

In Step 2 in FIG. 6, the TPE sheet is formed and patterned by heating the TPE sheet to softening and applying pressure between the mold and counter-plate until the features of the mold for making open-through holes have almost punched through the TPE sheet (Step 3) leaving a thin excess layer of TPE between the features for making open-through holes and the thin PDMS layer of the counter-plate. In Step 4, the TPE sheet is demolded with the TPE sheet staying with the counter-plate. The low adhesion force between the TPE membrane and the anti-sticking coating on the mold ensures that the TPE membrane sticks on the PDMS layer. The mold can then be reused immediately for another run and the counter-plate is used to support the TPE membrane during the next steps.

In Step 5, extra TPE from open-through membrane 100 is peeled off from around the parts of the membrane that will be formed into the spotters. In Step 6, first and second open-through TPE membranes 100,200 may be surface treated if desired, for example, to permanently change the surface from hydrophobic to hydrophilic. In Step 7, the hard silicon wafer of the counter-plate against which the second membrane was patterned is replaced with transparent hard plate 210 so that the first and second membranes can be properly aligned. In Step 8, the transparent plate is removed and the flexible sheet used in the production of the second membrane is peeled off the aligned membranes together with the thin PDMS layer. Further layers of the spotter can be built up, if desired, by repeating Steps 6-8 with one or more further open-through membranes. In Step 9, when all of the open-through membranes are aligned, they can be bonded permanently (for example by heating them for a few minutes) to form 3D microfluidic spotters 300. Contrary to hard thermoplastics, glass, and most other hard materials, a permanent thermal bond between TPE membranes can be obtained without applying any pressure. Further, for some TPE grades, the membranes will also create an irreversible and permanent bond when left in contact at room temperature for few hours. The assembled 3D microfluidic spotters can then be stored and used individually at a later time. The process described in FIG. 6 can be performed in a highly parallel fashion and requires no manual manipulation of the TPE membranes to fabricate and assemble the 3D microfluidic devices.

Example 4

Design Elements and Operation of a 3D Layered Microfluidic Spotter

Figure 7:
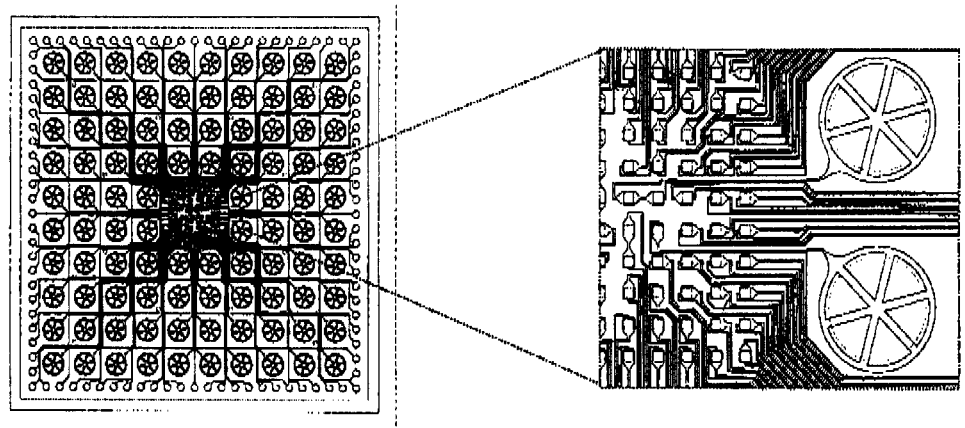
FIG. 7 is a CAD schematic of one of the 3D layered microfluidic spotting devices fabricated by the process depicted in FIG. 6.

Design Elements:

As seen in FIG. 7, the 3D microfluidic spotters produced in Example 3 are patterned with an array of 192 open-through holes, which are used as the inlets and outlets of the device. The spotter is based on two open-through TPE membranes. The top membrane defines the 96 inlets and 96 outlets while the bottom membrane is patterned with both (i) a 10×10 array of 50 µm spotting holes located centrally and (ii) 96 independent channels that connect the inlets, spotting holes, and outlets. The spotter is thus designed as a fluidic concentrator where the liquid dispensed in the inlets is transported by the channels and converge to the center of the spotter where the actual immobilization takes place on micron-size regions defined by the spotting holes. The dimensions of the spotters are kept to a low value of 1×1 cm in order to increase the number of spotters that can be patterned per run, but also to facilitate their integration with various detection systems where the area available to attach the spotter is limited (as for e.g. on microfabricated biosensor chips).

A rather high density of channels is required to address each of the spotting holes independently, which impose channel dimensions and inter-channel spacing in the 5 to 10 µm range. Four of the 96 channels are connected to two spotting holes to account for the smaller number of inlets than spotting holes. To facilitate the manual filling of the spotters, the 96 inlets are kept as large as possible (500 µm diameter) and are dispersed evenly across the surface of the spotter, while the 96 outlets (150 µm diameter) are distributed across the edge of the spotter. The design of the spotters has also been optimized for the use of capillary action to drive the liquid in the channels. It would be unpractical to interface such a highly-integrated spotter with an external pumping system. The channels placed under the inlets are patterned in a "star-shape" to ensure the correct filling of the spotter by capillary action in the eventuality that the dispensed liquid is not distributed evenly in the inlet. The shape of the channels around the spotting holes has also been optimized to facilitate the filling of the holes by capillary action.

In previous 3D microfluidic immobilization devices, isolated spots were typically obtained by transferring liquid back and forth from channels embedded inside the device to channels in contact with the substrate by using open-through holes (Chiu 2000; Juncker 2002; Juncker 2005; Kloter 2004; Wang 2006). This geometry implies that the area patterned on the substrate is larger than the open-through holes, as two "vias" are required to create each isolated spots. The immobilization of biological probes on small area thus critically depends on the fabrication of very small open-through holes, which is technically challenging. Also, in this layout, very high alignment accuracy is required to register properly the two layers of channels, which is particularly difficult for elastomeric materials (Chiu 2000). In the present spotter a single layer of channels is used and the biomolecules are immobilized directly by filling the open-through holes. With this geometry, the tolerance for the alignment between the top and bottom membranes of the device is relaxed to about 70 μm (while accuracy in the 5 to 10 μm range would have been required with the previous layout). Also, with this new design, spot size of 50 μm can be patterned without the need to punch open-through holes of smaller dimensions. The present design thus facilitates greatly the fabrication and assembly of the spotters, which is important when production at low-cost is being considered.

On the other hand, careful design of the channels around the spotting holes is needed to reduce the possibility of trapping air bubbles above the spotting holes during assays. This is particularly challenging as the deep wells formed by the spotting holes naturally act as capillary valves that block the liquid front. To facilitate the filling of the spotters by capillary action, the layout of the channels was optimized with the help of 3D numerical simulations based on the Lattice-Boltzmann method (Chen 1998; Clime 2009). Thus, the width of the channels leading to the spotting holes is increased from 10 μm to 60 μm just before the 50 μm spotting hole is reached. The larger width of the channel permits the liquid to surround the spotting hole, which reduces the radius of curvature of the liquid front in the plane of the device. This, in turn, increases the force exerted by the capillary action, which helps filling the spotting holes. Both simulations and experiments indicate that it takes considerably longer to fill the spotting holes than the surrounding channels. Consequently, air bubbles are trapped if the liquid in the surrounding channel is not held in place until the hole is properly filled. The channel is thus reduced abruptly on the right hand side of the spotting hole to ensure that that the liquid cannot reach the exit channel before the hole is properly filled. Air bubbles can be trapped when the width of the channel is reduced gradually rather than abruptly after the spotting hole. However, for most practical purposes, air bubbles, although undesirable, were not necessarily highly problematic as they typically disappear after about 30 min incubation time.

Figure 8:
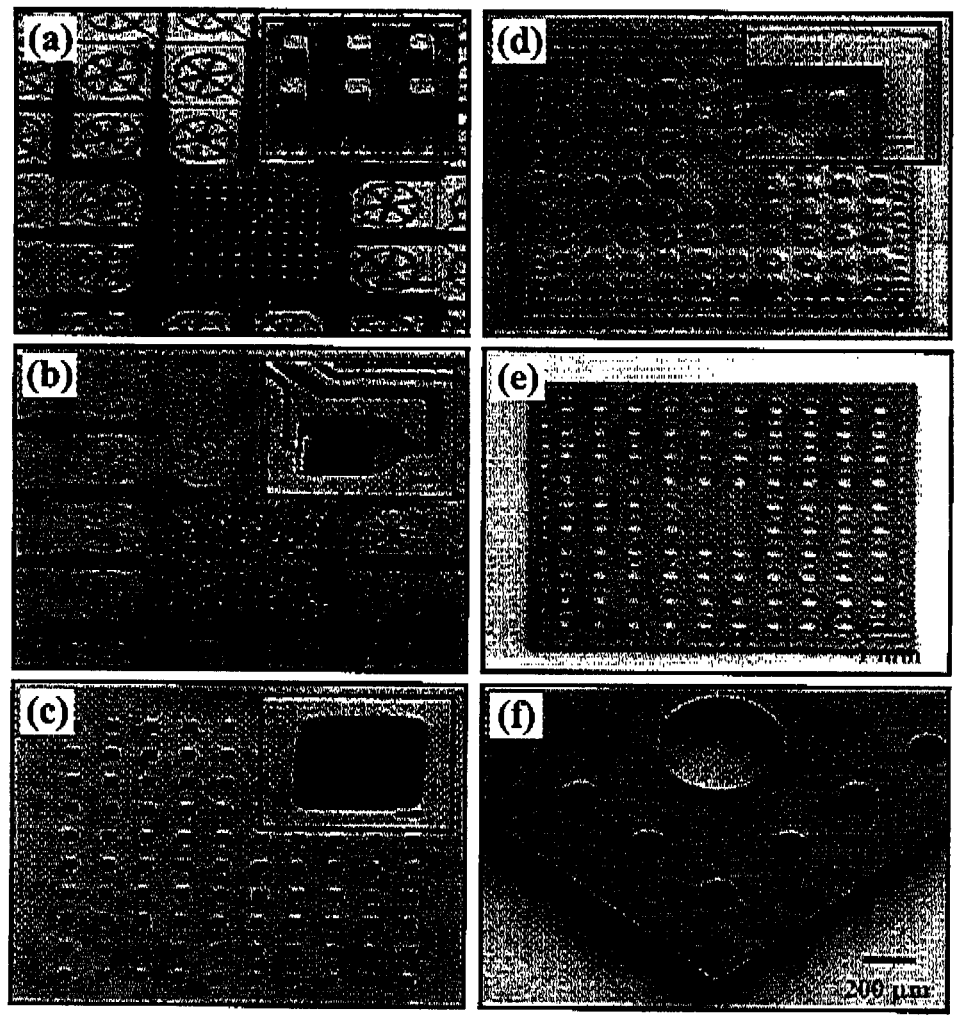
FIG. 8 depicts selected SEM micrographs illustrating the fabrication of the 3D layered microfluidic spotting devices schematically depicted in FIG. 6 where: (a) depicts SU8 mold used for the fabrication of the bottom TPE membrane; (b) depicts a top-side view of the bottom TPE membrane; (c) depicts a bottom-side view of the bottom TPE membrane; (d) depicts the SU8 mold used for the fabrication of the top TPE membrane; (e) depicts an overview of the top TPE membrane; and (f) depicts a close-up view of the top TPE membrane, in which scale bars in the insets of (a), (b), (c) and (d) correspond respectively to 50 μm, 20 μm, 10 μm and 200 μm. And the images shown in (d) and (e) were assembled from several SEM micrographs to achieve the desired field of view.

FIG. 8 shows SEM micrographs of a SU8/Si molds used for the fabrication of the TPE membranes for the spotters. The mold for the bottom membrane comprises two SU8 layers, one being an 8 μm thick layer to define the channels and the other being a 100 μm thick layer patterned in a 10×10 array of pillars to create the open-through holes. FIGS. 8(b) and 8(c) show images from the corresponding bottom TPE membrane after patterning. FIG. 8(b) shows the top side of the bottom TPE membrane where both the channels (that will be embedded inside the final spotters) and the top of the spotting holes are seen. In FIG. 8(c), the bottom TPE membrane has been flipped to reveal the openings that will be in contact with the substrate during immobilization assays. Both the channels and spotting holes are seen to be replicated very accurately. Even the submicron roughness of the SU8 molds is accurately reproduced in the TPE layer (not shown). The elastomeric nature of the TPE facilitates demolding and prevents the formation of defects resulting from undercut features, sidewall roughness, or shrinkage (which are commonly observed for the hot embossing of hard thermoplastics (Worgull 2009)).

FIG. 8(d) shows one of the 32 regions of the SU8 mold (200 μm thick, 100 mm diameter) used to pattern the top TPE membranes of the spotters. In addition to the pillars used to punch the inlets and outlets, the SU8 wall surrounding each of the individual regions is also visible. The SEM micrographs of FIGS. 8(e) and 8(f) show the corresponding open-through TPE membranes. These images highlight how the present invention can be used not only to pattern microscopic vias and spotting holes, but also to punch in a highly parallel manner the large number of inlets and outlets required in the proposed design and to effortlessly cut each of the individual membranes with very high accuracy.

After the patterning by hot embossing, the bottom and top TPE membranes were exposed to $O_2$ plasma to render their surface hydrophilic. This treatment was performed while the membranes were still attached to the hard counter-plate, thus allowing numerous membranes to be treated simultaneously with a minimum of manipulation. Alignment of the top and bottom membranes was achieved by placing an x-y-z manipulator on top of the x-y-z-theta stage of an optical microscope. The top membrane was placed facing down on a transparent sheet of Teflon™ attached to the x-y-z manipulator, while the bottom membrane was placed on a substrate that was deposited on the microscope stage. When acceptable alignment was achieved, the x-y-z manipulator was lowered until the two membranes were touching. Due to the rather weak attachment force between TPE and Teflon™, the top membrane could be easily transferred and attached to the bottom membrane. No other bonding steps were necessary to operate the spotters due to the reversible watertight sealing capability of TPE.

Figure 9:
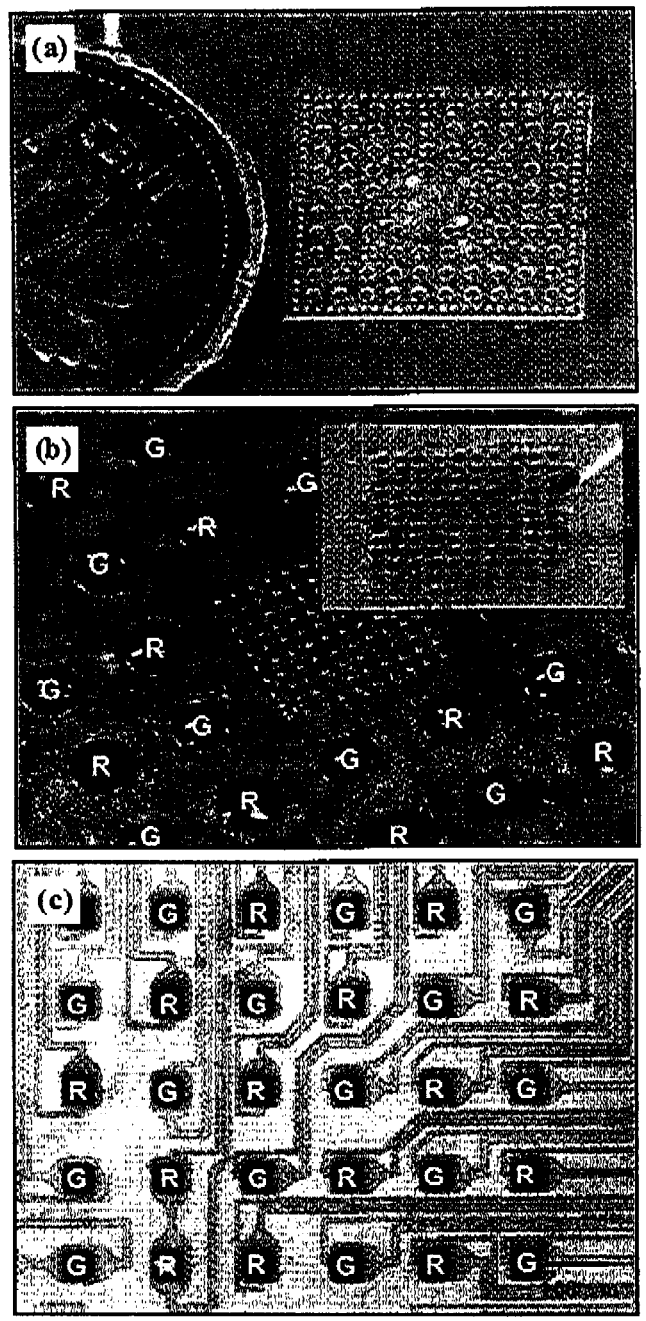
FIG. 9 depicts photographs of the assembled 3D layered microfluidic spotting device where (a) depicts the device before filling with dyes, (b) depicts the device after filling with red (R) and green dye (G), and (c) depicts a selected optical microscope image of the resulting red-green pattern obtained in the central region of the device.

General Operation:

FIG. 9 shows an assembled spotter attached to a transparent plastic substrate. Despite the relatively small dimensions and high inlet density of the spotters, a trained user can fill reliably the inlets by hand using a pipette. For example, FIG. 9(b) shows a spotter where every inlet is filled with either a red dye R or green dye G. The dyes have been positioned in the inlets so as to from the red-green chessboard pattern seen in FIG. 9(c), thus demonstrating the possibility of individually addressing the spotting holes. Since the liquid tends to align itself on the cavities formed by the inlets, the dispensed droplets can be placed quite accurately on the surface of the devices despite the positional error introduced by hand pipetting (see FIG. 3(b)).

Figure 10:
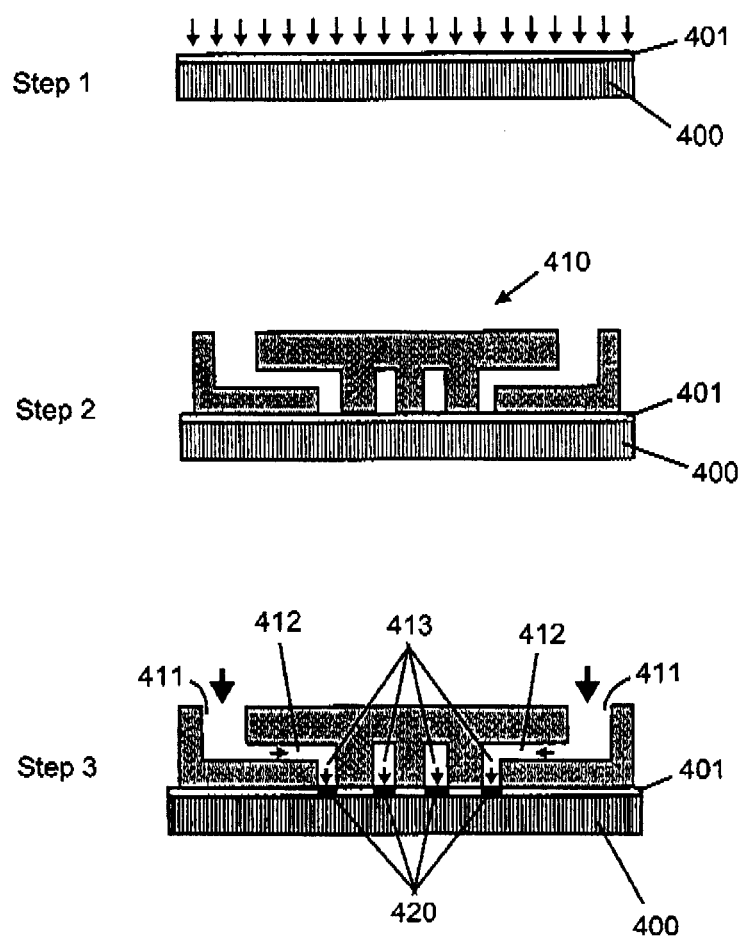
FIG. 10 depicts is a schematic drawing showing the mode of operation of a 3D layered microfluidic spotting device of the present invention.

FIG. 10 depicts a schematic drawing showing the general mode of operation of the spotter. In operation, substrate 400 to be spotted is surface activated as depicted in Step 1 to form activated region 401. Spotter 410 is applied on the substrate in Step 2. In Step 3, the reagents to be spotted are introduced in liquid form into inlets 411 and the liquid is drawn through channels 412 by capillary action to exit through outlets 413 whereupon spots 420 of the reagents are formed on substrate 400.

Example 5

Figure 11:
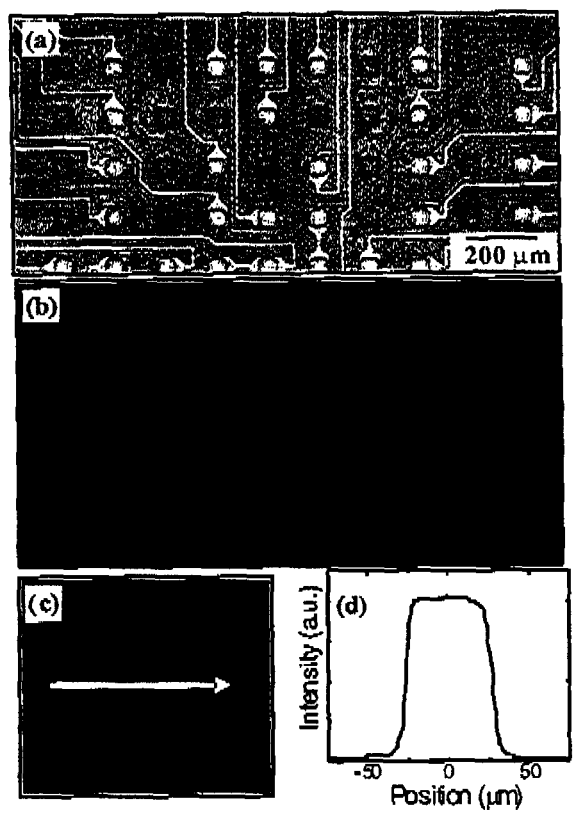
FIG. 11 depicts immobilization of Cy5-labeled DNA probes on a Zeonor substrate with 3D layered microfluidic spotting devices of the present invention where (a) depicts an optical microscope image showing channels filled with the DNA solution, (b)-(c) depicts fluorescence microscopic images of the immobilized DNA on the Zeonor substrate, and (d) depicts fluorescence intensity profile of the image shown in (c); and, FIG. 12 depicts immobilization and hybridization of proteins on a Zeonor substrate with 3D layered microfluidic spotting devices of the present invention where (a) depicts optical microscope image showing channels filled with the rabbit IgG and mouse IgG solutions where the letters M and R shown in (a) indicate respectively the position of mouse IgG and rabbit IgG solutions, (b) depicts fluorescence microscopic image of the Zeonor substrate after hybridization with Cy5-labeled goat anti-rabbit IgG, and (c) depicts fluorescence microscopic image of the Zeonor substrate after subsequent hybridization with Cy3-labeled sheep anti-rabbit IgG where red (R) and green (G) colors in (c) denote respectively the Cy5 and Cy3 channels of the fluorescence microscope.

Use as a 3D Layered Microfluidic Spotter for Immobilization of Biological Probes FIG. 11 shows an example of a typical DNA immobilization assay in which the 3D microfluidic spotting devices of the present invention have been used to pattern amino-modified Cy5-labeled DNA probes on an activated Zeonor plastic substrate. As seen in FIG. 11(a), some of the channels of the spotter have been filled selectively with the DNA solution so as to pattern the letters "IMI" while the other channels were left empty. FIG. 11(b) shows a fluorescence image of the Zeonor substrate after immobilization, removal of the spotter, and washing. The 50 μm Cy5-labeled DNA spots corresponding to the channels filled during the assay are clearly seen. The edges of the spots are sharply defined and their relative positioning is controlled very accurately. As seen in FIGS. 11(c) and 11(d), the uniformity of each spot is also excellent with an rms variation in fluorescence intensity of only 2%. This result contrasts with the uniformity typically obtained by techniques such as pin spotting, where it is challenging to achieve high spot uniformity at this scale. On the other hand, as visible on FIG. 11(b), spot-to-spot variations of the fluorescence intensity on the order of 20% rms were observed even if the same analyte was used to pattern each spot. This variation may arise from the partial evaporation of the liquid deposited in the inlets during the filling of the spotters and from the difficulties in controlling precisely the volume dispensed in each inlet.

Figure 12:
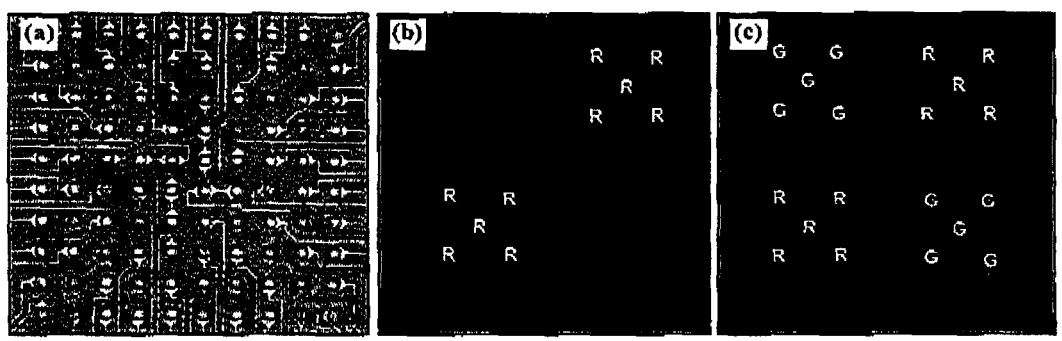

An immobilization and hybridization assay performed with proteins is also shown on FIG. 12. For this assay, solutions of unlabeled mouse IgG and rabbit IgG (5 mg/ml) were dispensed to selected inlets of the devices according to the layout shown in FIG. 12(a) for the immobilization on an activated Zeonor substrate. As the biological probes were unlabeled in this assay, the Zeonor substrate showed no significant fluorescent signal after immobilization of the IgG proteins. The substrate was then sequentially exposed to Cy5-labeled goat anti-rabbit IgG (10 μg/ml) and Cy3-labeled sheep anti-mouse IgG (10 μg/ml). FIG. 12(b) shows the fluorescence signal recorded after hybridization with only the Cy5-labeled goat anti-rabbit IgG. As expected, a strong Cy5 fluorescence signal is measured only on the spots patterned with rabbit IgG. Relatively high hybridization selectivity was obtained: the measured Cy5 fluorescence intensity was about 150 times lower on the mouse IgG spots than on the rabbit IgG spot. FIG. 12(c) shows a Cy3 (green, G) and Cy5 (red, R) combined fluorescence image obtained after subsequent hybridization of the Zeonor substrate with Cy3-labeled sheep anti-mouse IgG. Hybridization of the anti-mouse IgG was also found to be highly selective with significant Cy3 fluorescent signal detected only on the mouse IgG spots. These results confirm the integrity of the immobilized protein array and show that the 3D microfluidic devices we propose can be used to immobilize high quality protein and DNA arrays.

REFERENCES

The contents of the entirety of each of which are incorporated by this reference.

Abgrall P, Lattes C, Condra V R, Dollat X, Colin S P, Gu A M. (2006) A novel fabrication method of flexible and monolithic 3D microfluidic structures using lamination of SU-8 films. *Journal of Micromechanics and Microengineering.* 16, 113.

Anderson J R, Chiu D T, Jackman R J, Cherniayskaya O, McDonald J C, Wu H, Whitesides S H, Whitesides G M. (2000) Fabrication of Topologically Complex Three-Dimensional Microfluidic Systems in PDMS by Rapid Prototyping. *Anal. Chem.* 72 (14), 3158.

Anderson J R, Chiu D T, Jackman R J, Cherniayskaya O, McDonald J C, Whitesides G M. (2008) Microfluidic systems including three-dimensionally arrayed channel networks. United States Patent Publication US 2008/0122140 published May 29, 2008.

Bartholomeusz D A, Boutté R W, Andrade J D. (2005) Xurography: Rapid Prototyping of Microstructures Using a Cutting Plotter. *J. Microelectromech. Syst.* 14 (6), 1364.

Bartolo D, Degré G, Nghe P, Studer V. (2008) Microfluidic stickers. *Lab Chip.* 8, 274.

Bodas D, Khan-Malek C. (2006) Formation of more stable hydrophilic surfaces of PDMS by plasma and chemical treatments. *Microelectron. Eng.* 83, 1277.

Bruzewicz D A, Boncheva-Bettex M, Whitesides G M, Siegel A, Weibel D B, Shevkoplyas S, Martinez A. (2007) Fabrication of Conductive Pathways, Microcircuits and Microstructures in Microfluidic Networks. International Patent Publication WO 2007/061448 published May 31, 2007.

Carvalho B L. (2004) Elastomeric Tools for the Fabrication of Elastomeric Devices and Uses Thereof. United States Patent Publication US 2004/0241049 published Dec. 2, 2004.

Chang-Yen D A, Myszka D G, Gale B K. (2006) *J. Microelectromech. Syst.* 15, 1145-1151.

Chen S, Doolen G D. (1998) *Annu. Rev. Fluid. Mech.* 30, 329-364.

Chen C-S, Breslauer D N, Luna J I, Grimes A, Chin W-C, Leeb L P, Khine M. (2008) Shrinky-Dink microfluidics: 3D polystyrene chips. *Lab Chip.* 8, 622.

Chen I J, Lindner E. (2007) The Stability of Radio-Frequency Plasma-Treated Polydimethylsiloxane Surfaces. *Langmuir.* 23 (6), 3118.

Chiu D T, Jeon N L, Huang S, Kane R S, Wargo C J, Chai I S, Ingber D E, Whitesides G M. (2000) Patterned deposition of cells and proteins onto surfaces by using three-dimensional microfluidic systems. *Proc. Natl. Acad. Sci. U.S.A.*, 97 (6) 2408-2413.

Chiu D T, Pezzoli E, Wu H, Stroock A D, Whitesides G M. (2001) Using three-dimensional microfluidic networks for solving computationally hard problems. *Proceedings of the National Academy of Sciences.* 98 (6), 2961.

Chow C Y H. (2001a) Multi-layer microfluidic devices. U.S. Pat. No. 6,167,910 issued Jan. 2, 2001.

Chow C Y H. (2001b) Multi-layer microfluidic devices. U.S. Pat. No. 6,321,791 issued Nov. 27, 2001.

Chow C Y H). (2002) Multi-layer microfluidic devices. U.S. Pat. No. 6,494,230 issued Dec. 17, 2002.

Clime L, Brassard D, Veres T. (2009) *Microfluid. Nanofluid.* DOI: 10.1007/s10404-10009-10491-10409.

Corcoran C S, Jaecklein W J, Pricone R M, Thielman W S, Chiu C C-W, Chen D H-P. (2004) Sheet Having Micro-sized Architecture. United States Patent Publication US 2004/0126538 published Jul. 1, 2004.

Corcoran C S, Jaecklein W J, Pricone R M, Thielman W S, Chiu C C-W, Chen D H-P. (2005) Sheet Having Micro-sized Architecture. United States Patent Publication US 2005/0118393 published Jun. 2, 2005.

Duffy D C, Jackman R J, Vaeth K M, Jensen K F, Whitesides G M. (1999) Electroluminescent Materials with Feature Sizes as Small as 5 μm Using Elastomeric Membranes as Masks for Dry Lift-Off. *Adv. Mater.* 11 (7), 546.

Eddings M A, Miles A R, Eckman J W, Kim J, Rich R L, Gale B K, Myszka D G. (2008) *Anal. Biochem.* 382, 55-59.

Eddings M A, Eckman J W, Arana C A, Papalia G A, Connolly J E, Gale B K, Myszka D G. (2009) *Anal. Biochem.* 385, 309-313.

Geissler M, Roy E, Deneault J-S, Arbour M, Diaz-Quijada G A, Nantel A, Veres T. (2009a) Stretching the Stamp: A Flexible Approach to the Fabrication of Miniaturized DNA Arrays. *Small.* 5 (22), 2514-2518.

Geissler M, Roy E, Diaz-Quijada G A, Galas J-C, Veres T. (2009b) *ACS Appl. Mater. Interfaces.* 1, 1387-1395.

Griscom L, Degenaar P, LePioufle B, Tamiya E, Fujita H. (2001) *Jpn. J. Appl. Phys.* 40, 5485-5490.

Haraldsson K T, Hutchison J B, Sebra R P, Good B T, Anseth K S, Bowman C N. (2006) 3D polymeric microfluidic device fabrication via contact liquid photolithographic polymerization (CLiPP). *Sensors and actuators. B, Chemical.* 113, 454.

Heckele M, Durand A. (2001) Microstructured through-holes in plastic films by hot embossing. *Proceedings of 2nd international conference of the European society for precision engineering and nanotechnology.* p. 196.

Heckele M, Guber A E, Truckenmuller R. (2006) Replication and bonding techniques for integrated microfluidic systems. *Microsystem Technology.* 12, 1031.

Heo Y S, Cabrera L M, Song J W, Futai N, Tung Y-C, Smith G D, Takayama S. (2007) Characterization and Resolution of Evaporation-Mediated Osmolality Shifts That Constrain Microfluidic Cell Culture in Poly(dimethylsiloxane) Devices. *Anal. Chem.* 79 (3), 1126.

Hofmann O, Voirin G, Niedermann P, Manz A. (2002) *Anal. Chem.* 74, 5243-5250.

Hutchison J B, Haraldsson K T, Good B T, Sebra R P, Luo N, Ansetha K S, Bowman C N. (2004) Robust polymer microfluidic device fabrication via contact liquid photolithographic polymerization (CLiPP). *Lab Chip.* 4, 658.

Jeon N L, Chiu D T, Wargo C J, Wu H, Chai I S, Anderson J R, Whitesides G M. (2002) Design and Fabrication of Integrated Passive Valves and Pumps for Flexible Polymer 3-Dimensional Microfluidic Systems. *Biomed. Microdevices.* 4 (2), 117.

Jeon N L, Chiu D T, Wargo C J, Choi I S, Wu H, Anderson J R, Whitesides G M, McDonald J C, Metallo S J, Stone H A. (2004) Valves and pumps for microfluidic systems and method for making microfluidic systems. United States Patent Publication US 2004/0228734 published Nov. 18, 2004.

Jo B-H, Lerberghe L M V, Motsegood K M, Beebe D J. (2000) Three-Dimensional Micro-Channel Fabrication in Polydimethylsiloxane (PDMS) Elastomer. *J. Microelectromech. Syst.* 9 (1), 76.

Juncker D, Schmid H, Drechsler U, Wolf H, Wolf M, Michel B, de Rooij N, Delamarche E. (2002) *Anal. Chem.* 74, 6139-6144.

Juncker D, Schmid H, Delamarche E. (2005) *Nat. Mater.* 4, 622-628.

Karp C D, Pezzuto M, Maresch L, O'Connor S D. (2002) Microfluidic valve with partially restrained element. United States Patent Publication US 2002/0155010 published Oct. 24, 2002.

Kartalov E P, Walker C, Taylor C R, Anderson W F, Scherer A. (2006) Microfluidic vias enable nested bioarrays and autoregulatory devices in Newtonian fluids. *PNAS.* 103 (33), 12280.

Kikutani Y, Horiuchi T, Uchiyama K, Hisamoto H, Tokeshi M, Kitamori T. (2002) Glass microchip with three-dimensional micro channel network for 2×2 parallel synthesis. *Lab Chip.* 2, 188.

Kim J Y, Lee J Y B K A, Lee S H. (2005) Automatic aligning and bonding systelll of PDMS layer for the fabrication of 3D microfluidic channels. *Sens. Actuators, A.* 119, 593.

Kloter U, Schmid H, Wolf H, Michel B, Juncker D. (2004) *Technical Digest of the 17th IEEE International Conference on Micro Electro Mechanical Systems.* pp. 745-748.

Lee J N, Park C, Whitesides G M. (2003) Solvent Compatibility of Poly(dimethylsiloxane)-Based Microfluidic Devices. *Anal. Chem.* 75 (23), 6544.

Lee J, Ismagilov R F, Jiang X, Kenis P J A, Ferrigno R, Whitesides G M. (2004) Fluidic arrays and method of using. United States Patent Publication 2004/0258571 published Dec. 23, 2004.

Liu R H, Stremler M A, Sharp K V, Olsen M G, Santiago J G, Adrian R J, Aref H, Beebe D J. (2000) Passive mixing in a three-dimensional serpentine microchannel. *J. Microelectromech. Syst.* 9 (2), 190.

Luo Y, Zare R N. (2008) Perforated membrane method for fabricating three-dimensional polydimethylsiloxane microfluidic devices. *Lab Chip.* 8, 1688.

Maltezos G, Garcia E, Hamahan G, Gomez F A, Vyawhare S, van Dam R E, Chena Y, Scherer A. (2007) Design and fabrication of chemically robust three-dimensional microfluidic valves. *Lab Chip.* 7, 1209.

Martin D W M, Bennett W D. (1999) Microfabrication methods for microchannel reactors and separations systems. *Chem. Eng. Commun.* 173, 245.

Martin P M, Matson D W, Bennett W D, Stewart D C. (2000) Laminated Ceramic Microfluidic Components for Microreactor Applications. *Proceedings of the 4th International Conference on Microreaction Technology.* vol. 1998.

Martinez A W, Phillips S T, Whitesides G M. (2008) Three-dimensional microfluidic devices fabricated in layered paper and tape. *PNAS.* 105 (50), 19606.

Mazzeo A D, Dirckx M, Hardt D E. (2007) Single-step through-hole punching by hot embossing. *Annual technical conference-Antec, Conference proceedings.* 5, 2931.

Mehne C, Steger R, Koltay P, Warkentin D, Heckele M P. (2008) Large-area polymer microstructure replications through the hot embossing process using modular molding tools. *Proc. IMechE Vol. 222 Part B: J. Engineering Manufacture.* 93-99.

Mukhopadhyay R. (2007) When PDMS isn't the best. *Anal. Chem.* 79 (9), 3248.

Natarajan G, Humenik J N. (2006) 3D Ceramic Microfluidic Device Manufacturing. *Journal of Physics: Conference Series.* 34, 533.

Natarajan P, Yao D, Ellis T S, Azadegan R. (2007) Through-thickness embossing process for fabrication of three-dimensional thermoplastic parts. *Polym. Eng. Sci.* 47, 2075.

Natarajan S, Hatch A, Myszka D G, Gale B K. (2008a) *Anal. Chem.* 80, 8561-8567.

Natarajan S, Katsamba P S, Miles A, Eckman J, Papalia G A, Rich R L, Gale B K, Myszka D G. (2008b) *Anal. Biochem.* 373, 141-146.

O'Connor S D, Pezzuto M, Dantsker E. (2002) Multi-layer microfluidic device fabrication. United States Patent Publication US 2002/0112961 published Aug. 22, 2002.

O'Connor S D, Karp C D, Dantsker E. (2003a) Microfluidic flow control devices. United States Patent Publication US 2003/0196695 published Oct. 23, 2003.

O'Connor S D, Karp C D. (2003b) Microfluidic regulating device. U.S. Pat. No. 6,619,311 issued Sep. 16, 2003.

Peng Z-C, Ling Z-G, Tondra M, Liu C-G, Zhang M, Lian K, Goettert J, Hormes J. (2006) CMOS Compatible Integration of Three-Dimensional Microfluidic Systems Based on Low-Temperature Transfer of SU-8 Films. *J. Microelectromech. Syst.* 15 (3), 708.

Romanato F, Tormen M, Businaro L, Vaccari L, Stomeo T, Passaseo A, Fabrizio E D. (2004) X-ray lithography for 3D microfluidic applications. *Microelectron. Eng.* 73-74, 870.

Ryu W, Fasching R J, Vyakarnam M, Greco R S, Prinz F B. (2006) Microfabrication Technology of Biodegradable Polymers for Interconnecting Microstructures. *J. Microelectromech. Syst.* 15 (6), 1457.

Schift H, Bellin S, Gobrecht J. (2006) Perforated polymer membranes fabricated by nanoimprint. *Microelectron. Eng.* 83 (4-9), 873.

Sodunke T R, Turner K K, Caldwell S A, McBride K W, Reginato M J, Moses Noh H. (2007) Micropatterns of Matrigel for three-dimensional epithelial cultures. *Biomaterials*. 28, 4006.

Stoyanov I, Koch M T S G M, Uihndorf M. (2005) Low-cost and chemical resistant microfluidic devices based on thermoplastic elastomers for a novel biosensor system. *Mater. Res. Soc. Symp. Proc.* 872, 169.

Stoyanov I, Tewes M, Koch M, Lohndorf M. (2006) Microfluidic devices with integrated active valves based on thermoplastic elastomers. *Microelectron. Eng.* 83, 1681.

Sudarsan A P, Ugaz V M. (2004a) Printed Circuit Technology for Fabrication of Plastic-Based Microfluidic Devices. *Anal. Chem.* 76, 3229.

Sudarsan A P, Wang J, Ugaz V M. (2004b) Novel thermoplastic elastomers for microfluidic device construction. *8th International Conference on Miniaturized Systems for Chemistry and Life Sciences*. p. 22.

Sudarsan A P, Wang J, Ugaz V M. (2005) Thermoplastic Elastomer Gels: An Advanced Substrate for Microfluidic Chemical Analysis Systems. *Anal. Chem.* 77 (16), 5167.

Therriault D, White S R, Lewis J A. (2003) Chaotic mixing in three-dimensional microvascular networks fabricated by direct-write assembly. *Proteins: Struct., Funct. Bioinf.* 2, 265.

Toepke M W, Beebe D J. (2006) PDMS absorption of small molecules and consequences in microfluidic applications. *Lab Chip.* 6, 1484.

Trimbach D, Feldman K, Spencer N D, Broer D J, Bastiaansen C W M. (2003) Block Copolymer Thermoplastic Elastomers for Microcontact Printing, *Langmuir.* 19 (26), 10957-10961.

Veninga E P, Koetse M M. (2008) Device built by joining a plurality of layers. European Patent Publication EP 1 935 843 published Jun. 25, 2008.

Vickers J A, Caulum M M, Henry C S. (2006) Generation of Hydrophilic Poly(dimethylsiloxane) for High-Performance Microchip Electrophoresis. *Anal. Chem.* 78 (21), 7446.

Vozzi G, Flaim C, Ahluwalia A, Bhatia S. (2003) Fabrication of PLGA scaffolds using soft lithography and microsyringe deposition. *Biomaterials.* 24, 2533.

Wang Z-H, Meng Y-H, Ying P-Q, Qi C, Jin G. (2006) *Electrophoresis.* 27, 4078-4085.

Weigl B H, Bardell R, Schulte T, Battrell F, Hayenga J. (2001) Design and Rapid Prototyping of Thin-Film Laminate-Based Microfluidic Devices. *Biomed. Microdevices.* 4, 267.

Wen W, Sheng P, Niu X, Liu L. (2008) Constructing planar and three-dimensional microstructures with pdms-based conducting composite. International Patent Publication WO 2008/0123174 published May 29, 2008.

Whitesides G M, Anderson J R, Chiu D T, Jeon N-L, Huang S, Kane R, Choi I S, Ingber D E. (2004) Patterning of surfaces utilizing microfluidic stamps including three-dimensionally arrayed channel networks. United States Patent Publication US 2004/0121066 published Jun. 24, 2004.

Whitesides G M, Phillips S T, Martinez A W, Butte M J, Wang A, Thomas S, Sindi H. (2008) Patterned Paper as a Platform for Inexpensive, Low Volume, Portable Bioassays and Methods of Making Same. International Patent Publication WO/2008/049083 published Apr. 24, 2008.

Worgull M. 2009. *Hot Embossing—Theory and Technology of Microreplication*. (William Andrew publisher, Oxford, UK) Section 5.5.3.2, pages 154-157.

Wu H, Odom T W, Chiu D T, Whitesides G M. (2003) Fabrication of Complex Three-Dimensional Microchannel Systems in PDMS. *Journal of the American Chemical Society.* 125 (2), 554 (2003).

Yoon L-B, Han C-H, Yoon E, Kim C-K. (1988) Novel monolithic and multilevel integration of high-precision 3-D microfluidic components. *Proceedings of SPIE The International Society for Optical Engineering.* 3515, 183.

Zhao S, Cong H, Pan T. (2009) Direct projection on dry-film photoresist (DP2): Do-it-yourself three-dimensional polymer microfluidics. *Lab Chip.* 9, 1128-1132.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A process of providing open-through holes in a thermoplastic elastomer (TPE) membrane comprising:
   (i) providing a mold having protruding features for producing open-through holes in the TPE membrane;
   (ii) providing a counter-plate to the mold;
   (iii) providing sufficient TPE material in the mold such that, after processing, the mold cavity is properly filled with the TPE material, the TPE material provided as an extruded film having a thickness greater than a height of the protruding features;
   (iv) heating the TPE material to a temperature above the softening temperature of the TPE material to soften the TPE material;
   (v) applying a compressive pressure between the mold and the counter-plate for a sufficient length of time to form and pattern the TPE membrane from the TPE material without permitting the protruding features of the mold to come into contact with the counter-plate, thereby ensuring that an excess layer of the TPE material remains between the protruding features and the counter-plate;
   (vi) cooling the TPE membrane; and,
   (vii) demolding the patterned TPE membrane whereby the demolding results directly in removal of the excess layer from the TPE membrane to produce the open-through holes in the TPE membrane, the removal of the excess layer being controlled by controlling adhesion between the TPE and the mold or counter-plate.

2. The process according to claim 1, wherein the counter-plate comprises:
   a hard material and an elastic layer, the elastic layer having a softening temperature above the temperature at which the TPE membrane is patterned, wherein the elastic layer is in direct contact with the TPE material during patterning and has an elasticity sufficient to transfer a uniform compressive force on the TPE membrane during cooling to reduce appearance of defects in the TPE membrane;
   a hard material consisting of silicon, a metal or a metal alloy, and an elastic layer, the elastic layer having a softening temperature above the temperature at which the TPE membrane is patterned, wherein the elastic layer is in direct contact with the TPE material during patterning and has an elasticity sufficient to transfer a uniform compressive force on the TPE membrane during cooling to reduce appearance of defects in the TPE membrane; or a hard material. and an elastic layer, the elastic layer having a softening temperature above the temperature at which the TPE membrane is patterned, wherein the elastic layer is in direct contact with the TPE material during patterning and has an elasticity sufficient to transfer a uniform compressive force on the TPE membrane during cooling to reduce appearance of defects in the TPE membrane, and a layer of flexible, heat resistant material between the hard material and the elastic layer.

3. The process according to claim 2, wherein the elastic layer:

has a Young's modulus in a range of from 0.01 MPa to 100 MPa comprises a thermoset rubber or a second thermoplastic elastomer;

comprises polydimethylsiloxane:

has a thickness of 1000 μm or less; has a thickness of

200 μm or less; or has a thickness in a range of 25-200 um.

4. The process according to claim 1, wherein providing sufficient TPE material comprises providing a styrene-ethylene/butylene-styrene block copolymer, an ethylene-vinyl acetate copolymer, a styrene-isoprene-butadiene block copolymer, an ionomeric TPE, a single phase melt processable TPE or any blend thereof containing an amount less than 40% w/w of oil, a tackifier, or a mixture thereof.

5. The process according to claim 1, wherein the mold provided further comprises features for forming one or more channels, chambers, alignment marks, valves, pumps or mixing regions.

6. The process according to claim 1, wherein the mold provided comprises a photoresist material.

7. The process according claim 1, wherein heating the TPE material comprises heating the TPE material to a temperature that is lower than decomposition temperatures of the TPE material, and, for block copolymer TPE, 30° C. or more above $T_g$ of soft rubbery phase of the TPE material or, for random copolymer TPE, 5° C. or more above $T_g$ of the TPE material.

8. The process according to claim 1, wherein the excess layer is 0.01-1 μm thick.

9. The process according to claim 1, wherein providing the mold comprises providing the mold treated with an adhesion inhibitor so that the TPE membrane initially sticks to the counter-plate during demolding and adhesion of the excess layer to the counter-plate results in removal of the excess layer from the open-through holes of the TPE membrane when demolding is completed by removing the TPE membrane from the counter-plate.

10. The process according to claim 1, wherein the open-through holes are micrometric in size and are free from significant defects or deformations.

11. The process according to claim 1, wherein the TPE membrane has a thickness in a range of 1-500 μm.

12. The process according to claim 1, wherein porosity of the TPE membrane and shape of the open-through holes in the membrane are reversibly tuned by stretching the TPE membrane.

13. The process according to claim 1, wherein providing the TPE material comprises selecting the TPE material so the TPE membrane is reversibly or permanently bonded to another TPE membrane or another material without pretreatment of the membranes.

14. A process of providing open-through holes in a thermoplastic elastomer (TPE) membrane comprising:

(i) providing a mold having protruding features for producing open-through holes in the TPE membrane;

(ii) providing a counter-plate to the mold;

(iii) providing sufficient TPE material in the mold such that, after processing, the mold cavity is properly filled with the TPE material;

(iv) heating the TPE material to a temperature above the softening temperature of the TPE material to soften the TPE material;

(v) applying a compressive pressure between the mold and the counter-plate for a sufficient length of time to form and pattern the TPE membrane from the TPE material without permitting the protruding features of the mold to come into contact the counter-plate, thereby ensuring that an excess layer of the TPE material less than 1 μm thick remains between the protruding features and the counter-plate;

(vi) cooling the TPE membrane; and, (vii) demolding the patterned TPE membrane whereby the demolding results directly in removal of the excess layer from the TPE membrane to produce the open-through holes in the TPE membrane, the removal of the excess layer being controlled by controlling adhesion between the TPE and the mold or counter-plate.

15. The process according to claim 14, wherein the open-through holes are micrometric in size and are free from significant defects or deformations; and the TPE membrane has a thickness in a range of 1-500 μm.

16. The process according to claim 14, wherein providing the TPE material comprises selecting the TPE material so the TPE membrane is reversibly or permanently bonded to another TPE membrane or another material without pretreatment of the membranes.

17. The process according to claim 14, wherein the mold provided:

further comprises features for forming one or more channels, chambers, alignment marks, valves, pumps or mixing regions; or is made of a photoresist material.

18. The process according to claim 14 wherein the TPE material provided is a film.

19. The process according to claim 14, wherein providing sufficient TPE material comprises providing a styrene-ethylene/butylene-styrene block copolymer, an ethylene-vinyl acetate copolymer, a styrene-isoprene-butadiene block copolymer, an ionomeric TPE, a single phase melt processable TPE or any blend thereof containing an amount less than 40% w/w of oil, a tackifier, or a mixture thereof.

20. The process according to claim 14, wherein heating the TPE material comprises heating the TPE material to a temperature that is lower than decomposition temperatures of the TPE material, and, for block copolymer TPE, 30° C. or more above $T_g$ of soft rubbery phase of the TPE material or, for random copolymer TPE, 5° C. or more above $T_g$ of the TPE material.

21. A process of providing open-through holes in a thermoplastic elastomer (TPE) membrane comprising:

(i) providing a mold having protruding features for producing open-through holes in the TPE membrane;

(ii) providing a counter-plate to the mold;

(iii) providing sufficient TPE material in the mold such that, after processing, the mold cavity is properly filled with the TPE material;
(iv) heating the TPE material to a temperature above the softening temperature of the TPE material to soften the TPE material;
(v) applying a compressive pressure between the mold and the counter-plate for a sufficient length of time to form and pattern the TPE membrane from the TPE material without permitting the protruding features of the mold to come into contact the counter-plate, thereby ensuring that an excess layer of the TPE material remains between the protruding features and the counter-plate;
(vi) cooling the TPE membrane; and,
(vii) demolding the patterned TPE membrane wherein the demolding results directly in removal of the excess layer from the TPE membrane to produce the open-through holes in the TPE membrane, the removal of the excess layer being controlled by controlling adhesion between the TPE and the mold or counter-plate, wherein the counter-plate provided comprises a hard material and an elastic layer; the elastic layer has a softening temperature above the temperature at which the TPE membrane is patterned; the elastic layer is in direct contact with the TPE material during patterning; and the elastic layer has an elasticity sufficient to transfer a uniform compressive force on the TPE membrane during cooling to reduce appearance of defects in the TPE membrane.

22. The process according to claim 21, wherein the hard material consists of silicon, a metal or a metal alloy.

23. The process according to claim 21, wherein counter-plate provided further comprises a layer of flexible, heat resistant material between the hard material and the elastic layer.

24. The process according to claim 21, wherein the elastic layer:
has a Young's modulus in a range of from 0.01 MPa to 100 MPa;
comprises a thermoset rubber or a second thermoplastic elastomer;
comprises polydimethylsiloxane:
has a thickness of 1000 μm or less;
has a thickness of 200 μm or less; or
has a thickness in a range of 25-200 μm.

25. The process according to claim 21, wherein:
providing the TPE material comprises selecting the TPE material so the TPE membrane is reversibly or permanently bonded to another TPE membrane or another material without pre-treatment of the membranes;
the mold provided further comprises features for forming one or more channels, chambers, alignment marks, valves, pumps or mixing regions; or
the mold provided is made of a photoresist material.

26. The process according to claim 21, wherein providing sufficient TPE material comprises providing a styrene-ethylene/butylene-styrene block copolymer, an ethylene-vinyl acetate copolymer, a styrene-isoprene-butadiene block copolymer, an ionomeric TPE, a single phase melt processable TPE or any blend thereof containing an amount less than 40% w/w of oil, a tackifier, or a mixture thereof.

27. The process according to claim 21, wherein heating the TPE material comprises heating the TPE material to a temperature that is lower than decomposition temperatures of the TPE material, and, for block copolymer TPE, 30° C. or more above $T_g$ of soft rubbery phase of the TPE material or, for random copolymer TPE, 5° C. or more above $T_g$ of the TPE material.

28. The process according to claim 21 wherein the TPE material provided is a film.

* * * * *